United States Patent
Roimela

(10) Patent No.: US 10,311,633 B2
(45) Date of Patent: Jun. 4, 2019

(54) METHOD AND APPARATUS FOR VISUALIZATION OF GEO-LOCATED MEDIA CONTENTS IN 3D RENDERING APPLICATIONS

(71) Applicant: Nokia Technologies Oy, Espoo (FI)

(72) Inventor: Kimmo Roimela, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/111,212

(22) PCT Filed: Sep. 30, 2014

(86) PCT No.: PCT/FI2014/050742
§ 371 (c)(1),
(2) Date: Jul. 13, 2016

(87) PCT Pub. No.: WO2015/107260
PCT Pub. Date: Jul. 23, 2015

(65) Prior Publication Data
US 2016/0335796 A1    Nov. 17, 2016

Related U.S. Application Data

(63) Continuation-in-part of application No. 14/158,249, filed on Jan. 17, 2014, now abandoned.

(51) Int. Cl.
*G06T 17/05* (2011.01)
*G06F 3/0481* (2013.01)
*G06T 15/06* (2011.01)

(52) U.S. Cl.
CPC .......... *G06T 17/05* (2013.01); *G06F 3/04815* (2013.01); *G06T 15/06* (2013.01)

(58) Field of Classification Search
USPC ....................................................... 345/419
See application file for complete search history.

(56) References Cited

U.S. PATENT DOCUMENTS 5,671,381 A    9/1997    Strasnick et al.
7,800,608 B2   9/2010    Kim et al.
(Continued)

FOREIGN PATENT DOCUMENTS

CN    101109642 A    1/2008
CN    101978394 A    2/2011
(Continued)

OTHER PUBLICATIONS

International Search Report and Written Opinion received for corresponding Patent Cooperation Treaty Application No. PCT/FI2014/050742, dated Dec. 23, 2014, 15 pages.
(Continued)

*Primary Examiner* — Kimbinh T Nguyen
(74) *Attorney, Agent, or Firm* — Ditthavong & Steiner, P.C.

(57) ABSTRACT

An approach is provided for accurate processing and registering of media content for rendering in 3D maps and other applications. The approach includes determining at least one first pixel of at least one image that geometrically corresponds to at least one second pixel of at least one rendered three-dimensional map. Further, the approach includes processing and/or facilitating a processing of (a) the at least one first pixel; (b) the at least one second pixel; (c) metadata associated with at least one of the at least one first pixel and the second pixel; or (d) a combination thereof to determine at least one confidence value, wherein the at least one confidence value is indicative of an estimated level of geometric distortion resulting from projecting the at least one first pixel onto the at least one second pixel. Furthermore, the approach includes determining whether to cause, at least in part, a rendering of the at least one first pixel onto the at least one rendered three-dimensional map based, at least in part, on the confidence value.

18 Claims, 22 Drawing Sheets

(56) References Cited

U.S. PATENT DOCUMENTS

| | | | |
|---|---|---|---|
| 8,228,327 B2 | 7/2012 | Hendrickson et al. | |
| 8,264,504 B2 | 9/2012 | Naimark | |
| 8,520,979 B2* | 8/2013 | Conwell | G06F 17/30265 382/219 |
| 8,525,825 B2 | 9/2013 | Zhu et al. | |
| 8,610,741 B2 | 12/2013 | Szeliski et al. | |
| 8,861,841 B2 | 10/2014 | Bell et al. | |
| 8,963,915 B2 | 2/2015 | Zhu et al. | |
| 8,965,741 B2 | 2/2015 | McCulloch et al. | |
| 9,280,852 B2* | 3/2016 | Adhikari | G06Q 30/0623 |
| 2006/0028473 A1 | 2/2006 | Santiago | |
| 2008/0106593 A1 | 5/2008 | Harrell | |
| 2008/0291217 A1 | 11/2008 | Vincent et al. | |
| 2009/0237510 A1 | 9/2009 | Chen et al. | |
| 2010/0257252 A1* | 10/2010 | Dougherty | G06T 19/006 709/217 |
| 2011/0110557 A1* | 5/2011 | Clark | G01C 11/06 382/103 |
| 2011/0319100 A1 | 12/2011 | Flanagan | |
| 2012/0086775 A1 | 4/2012 | Bae et al. | |
| 2012/0120101 A1* | 5/2012 | Adhikari | G06Q 30/0623 345/633 |
| 2013/0009950 A1 | 1/2013 | Nguyen | |
| 2013/0086517 A1 | 4/2013 | Van Lancker et al. | |
| 2013/0106841 A1 | 5/2013 | Ko | |
| 2013/0132375 A1 | 5/2013 | Jones et al. | |
| 2013/0208094 A1* | 8/2013 | Tian | G06T 5/005 348/46 |
| 2013/0328924 A1* | 12/2013 | Arikan | G06T 11/20 345/629 |
| 2013/0345959 A1* | 12/2013 | van Os | G01C 21/3632 701/408 |
| 2014/0063061 A1* | 3/2014 | Reitan | G09G 3/003 345/633 |
| 2014/0125660 A1 | 5/2014 | Redmann | |
| 2014/0153784 A1 | 6/2014 | Gandolph et al. | |
| 2014/0184596 A1* | 7/2014 | Unger | G06T 15/04 345/423 |
| 2014/0267243 A1* | 9/2014 | Venkataraman | G06T 7/0065 345/419 |
| 2015/0049915 A1* | 2/2015 | Ciurea | H04N 13/232 382/106 |
| 2015/0371431 A1* | 12/2015 | Korb | G06T 9/00 382/113 |
| 2015/0381966 A1* | 12/2015 | Tian | G06T 5/005 348/47 |
| 2017/0094243 A1* | 3/2017 | Venkataraman | H04N 13/0007 |
| 2017/0236006 A1* | 8/2017 | Davis | G06K 9/00671 715/716 |

FOREIGN PATENT DOCUMENTS

| | | |
|---|---|---|
| CN | 103177475 A | 6/2013 |
| JP | H11-108684 A | 4/1999 |
| WO | 2014/056899 A1 | 4/2014 |

OTHER PUBLICATIONS

Ben-David, A., "View-Dependent Texture Projection Mapping for Urban Scenes".
Fu J., et al., "Augmented and Interactive Video Playback Based on Global Camera Pose".
De Haan G., et al. "Egocentric Navigation for Video Surveilance in 3D Virtual Environments".
Koch R., "3D-Scene Modeling from Image Sequences".
Hu X and Mordohal P., "Least Commitment, Viewpoint-based, Multi-view Stereo".
Kopf et al., "Street Slide: Browsing Street Level Imagery", Microsoft, Jul. 1, 2010, 8 pages.
Reche et al., "View-Dependent Layered Projective Texture Maps", INRIA, RR-5016, Nov. 2003, 23 pages.
Watson et al., "Towards a Perceptual Method of Blending for Image-Based Models", Special Effects and Rendering. Proceedings from SIGRAD, No. 007, Nov. 28, 2002, pp. 35-40.
Debevec et al., "Modeling and Rendering Architecture From Photographs: A Hybrid Geometry- and Image-Based Approach", SIGGRAPH '96 Proceedings of the 23rd annual conference on Computer graphics and interactive techniques, Aug. 1996, pp. 11-20.
Baumberg, "Blending Images for Texturing 3D Models", Proc. Conf. on British Machine Vision Association, 2002, pp. 404-413.
"Sentinel Adaptive Bandwidth AVE Video Fusion", Sentinelave Ave LLC, Retrieved on Aug. 14, 2017, Webpage available at : https://www.sentinelave.com/AVEVideoFusion.html.
"Sentinel AVE to Demonstrate Amazing 3D Visualization Application for Security", PRLOG Press Release Distribution, Retrieved on Augut 23, 2017, Webpage available at : https://www.prlog.org/11414449-sentinel-ave-to-demonstrate-amazing-3d-visualization-application-for-security.html.
Cipiloglu, "A Fuzzy Logic Based Approach for Enhancing Depth Perception in Computer Graphics", Thesis, May, 2010, 111 pages.
Pollefeys et al., "Detailed Real-Time Urban 3D Reconstruction From Video", International Journal of Computer Vision, vol. 78, No. 2-3, Jul. 2008, pp. 1-43.
Shih et al., "A Depth Refinement Algorithm for Multi-View Video Synthesis", IEEE International Conference on Acoustics Speech and Signal Processing, Mar. 14-19, 2010, pp. 742-745.
Shade et al., "Layered Depth Images", Proceedings of the 25th annual conference on Computer graphics and interactive techniques, Jul. 1, 1998, 12 pages.
Non-Final Office action received for corresponding U.S. Appl. No. 14/158,249, dated Jul. 31, 2015, 15 pages.
Final Office action received for corresponding U.S. Appl. No. 14/158,249, dated Nov. 6, 2015, 14 pages.
Non-Final Office action received for corresponding U.S. Appl. No. 14/158,249, dated Mar. 14, 2016, 16 pages.
Extended European Search Report received for corresponding European Patent Application No. 14878528.0, dated Jun. 7, 2017, 7 pages.
Office Action for corresponding Chinese Patent Application No. 201480077219.X, dated Jul. 3, 2018, 14 pages, English Language Summary Included.
Office Action for related Chinese Patent Application No. 201480077219.X, dated Feb. 3, 2019, 10 pages.

* cited by examiner

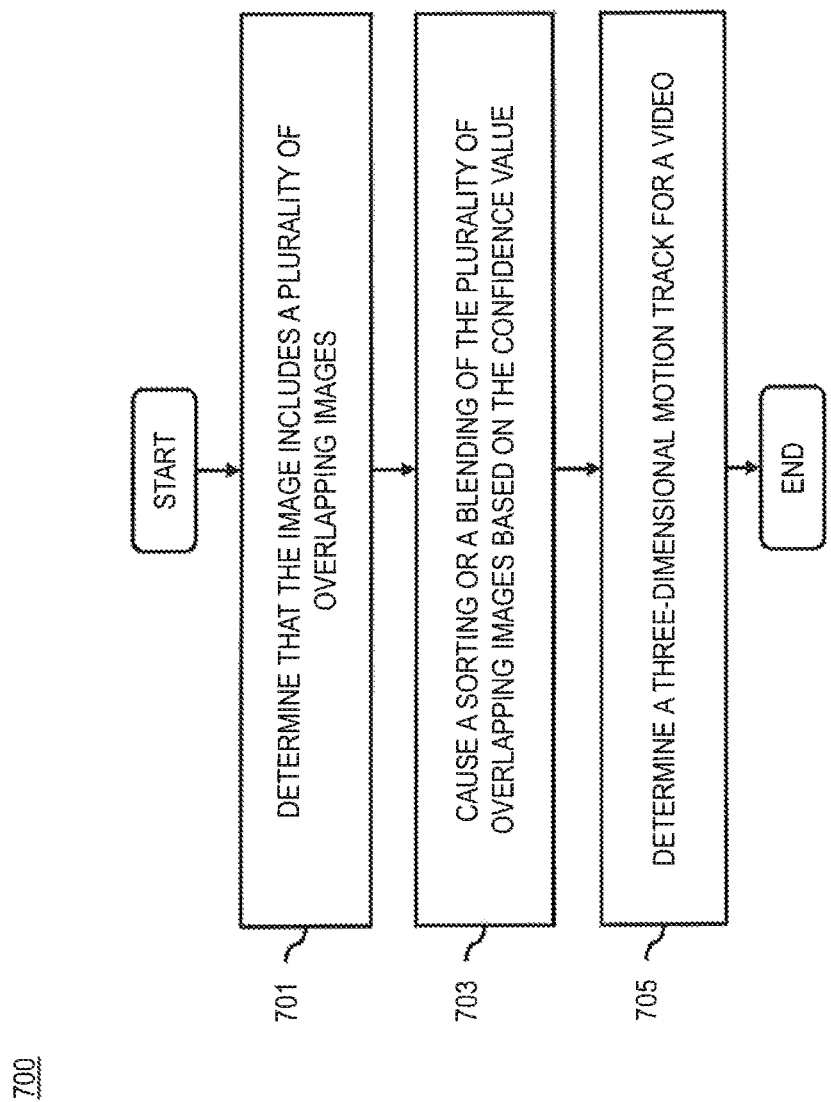

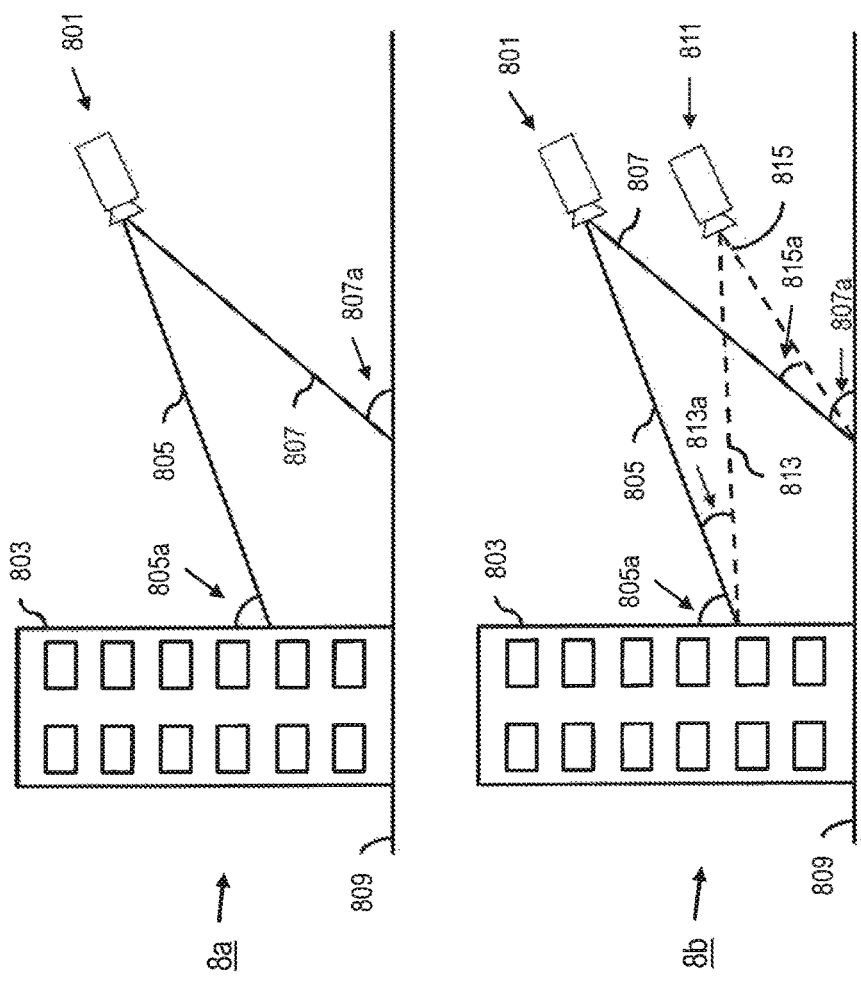

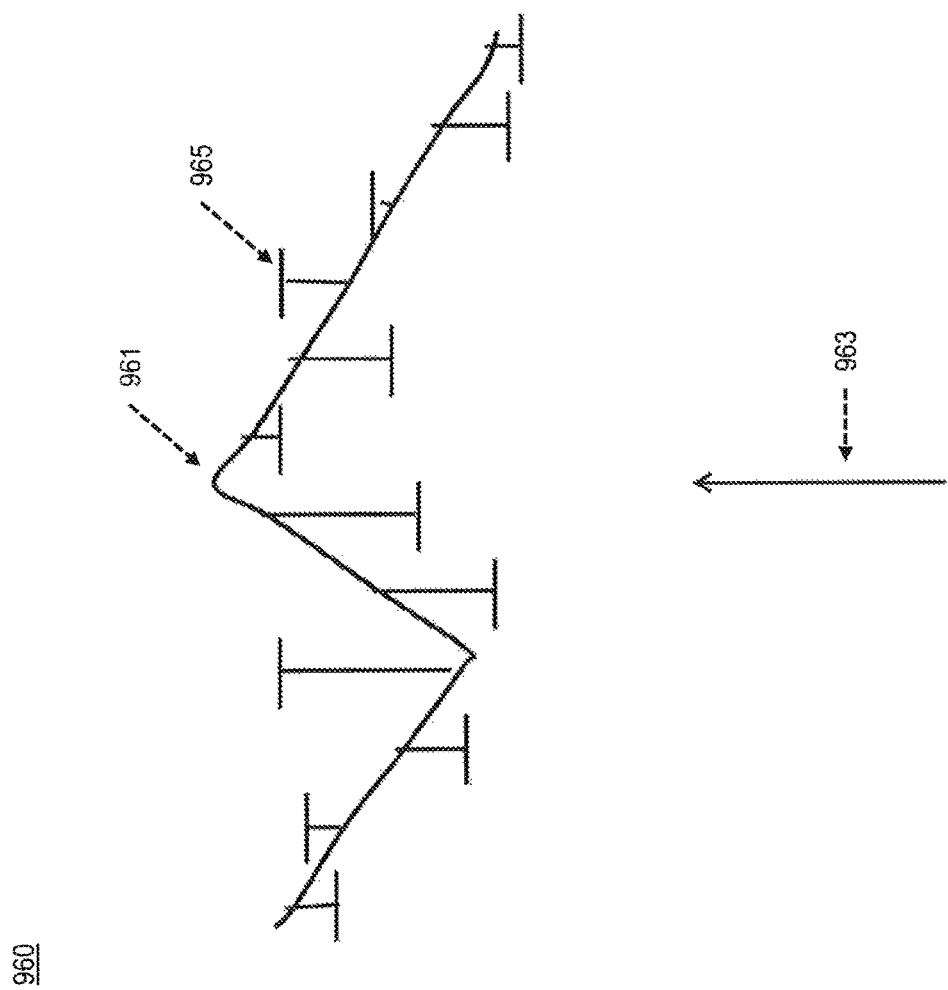

METHOD AND APPARATUS FOR VISUALIZATION OF GEO-LOCATED MEDIA CONTENTS IN 3D RENDERING APPLICATIONS

RELATED APPLICATION

This application was originally filed as Patent Cooperation Treaty Application No. PCT/FI2014/050742 filed Sep. 30, 2014 which claims priority benefit to U.S. Non-Provisional patent application Ser. No. 14/158,249 filed Jan. 17, 2014

BACKGROUND

Service providers and device manufacturers (e.g., wireless, cellular, etc.) are continually challenged to deliver value and convenience to consumers by, for example, providing compelling network services. One area of development has been increasing capabilities of user devices (e.g., mobile phones, tablets, cameras, etc.), which users utilize to capture or generate media content (e.g., images, video, audio, etc.) In many cases, the user devices can determine and associate metadata with a media content item where, for example, the metadata may include location information (e.g., global positioning system (GPS) coordinates), date, time, user information, etc. In some instances, using three dimensional (3D) reconstruction techniques, it is possible to accurately register the media contents with respect to real-world locations and utilize in other applications (e.g., a 3D map application.) For example, a user may wish to use an image, captured by the user, of a certain building for integration and presentation in a map application, which may be overlaid on the map according to the location information of the building (e.g., in metadata of the image file.) Accordingly, service providers and device manufacturers face significant technical challenges in accurate processing and registering of media content for use in 3D maps and other applications.

SOME EXAMPLE EMBODIMENTS

Therefore, there is a need for an approach for accurate processing and registering of media content for rendering in 3D maps and other applications.

According to one embodiment, a method comprises determining at least one first pixel of at least one image that geometrically corresponds to at least one second pixel of at least one rendered three-dimensional map. The method also comprises processing and/or facilitating a processing of (a) the at least one first pixel; (b) the at least one second pixel; (c) metadata associated with at least one of the at least one first pixel and the second pixel; or (d) a combination thereof to determine at least one confidence value, wherein the at least one confidence value is indicative of an estimated level of geometric distortion resulting from projecting the at least one first pixel onto the at least one second pixel. Further, the method comprises determining whether to cause, at least in part, a rendering of the at least one first pixel onto the at least one rendered three-dimensional map based, at least in part, on the confidence value.

According to another embodiment, an apparatus comprises at least one processor, and at least one memory including computer program code for one or more computer programs, the at least one memory and the computer program code configured to, with the at least one processor, cause, at least in part, the apparatus to determine at least one first pixel of at least one image that geometrically corresponds to at least one second pixel of at least one rendered three-dimensional map. The apparatus is also caused to process and/or facilitate a processing of (a) the at least one first pixel; (b) the at least one second pixel; (c) metadata associated with at least one of the at least one first pixel and the second pixel; or (d) a combination thereof to determine at least one confidence value, wherein the at least one confidence value is indicative of an estimated level of geometric distortion resulting from projecting the at least one first pixel onto the at least one second pixel. Further, the apparatus is caused to determine whether to cause, at least in part, a rendering of the at least one first pixel onto the at least one rendered three-dimensional map based, at least in part, on the confidence value.

According to another embodiment, a computer-readable storage medium carries one or more sequences of one or more instructions which, when executed by one or more processors, cause, at least in part, an apparatus to determine at least one first pixel of at least one image that geometrically corresponds to at least one second pixel of at least one rendered three-dimensional map. The apparatus is also caused to process and/or facilitate a processing of (a) the at least one first pixel; (b) the at least one second pixel; (c) metadata associated with at least one of the at least one first pixel and the second pixel; or (d) a combination thereof to determine at least one confidence value, wherein the at least one confidence value is indicative of an estimated level of geometric distortion resulting from projecting the at least one first pixel onto the at least one second pixel. Further, the apparatus is caused to determine whether to cause, at least in part, a rendering of the at least one first pixel onto the at least one rendered three-dimensional map based, at least in part, on the confidence value.

According to another embodiment, an apparatus comprises means for determining at least one first pixel of at least one image that geometrically corresponds to at least one second pixel of at least one rendered three-dimensional map. The apparatus also comprises means for processing and/or facilitating a processing of (a) the at least one first pixel; (b) the at least one second pixel; (c) metadata associated with at least one of the at least one first pixel and the second pixel; or (d) a combination thereof to determine at least one confidence value, wherein the at least one confidence value is indicative of an estimated level of geometric distortion resulting from projecting the at least one first pixel onto the at least one second pixel. Further, the apparatus comprises means for determining whether to cause, at least in part, a rendering of the at least one first pixel onto the at least one rendered three-dimensional map based, at least in part, on the confidence value.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 4 through 7 are flowcharts for processing pixels of a first image and a second image to determine a confidence value for rendering the first pixels onto a three-dimensional rendering of the second image, according to various embodiments;

FIG. 8 illustrates various cameras and associated rays between the cameras and an object in camera view, according to various embodiments;

FIGS. 9E through 9G illustrate graphical representation of the analysis of depth offset values in rendering of objects, according to various embodiments;

DESCRIPTION OF SOME EMBODIMENTS

Figure 1:
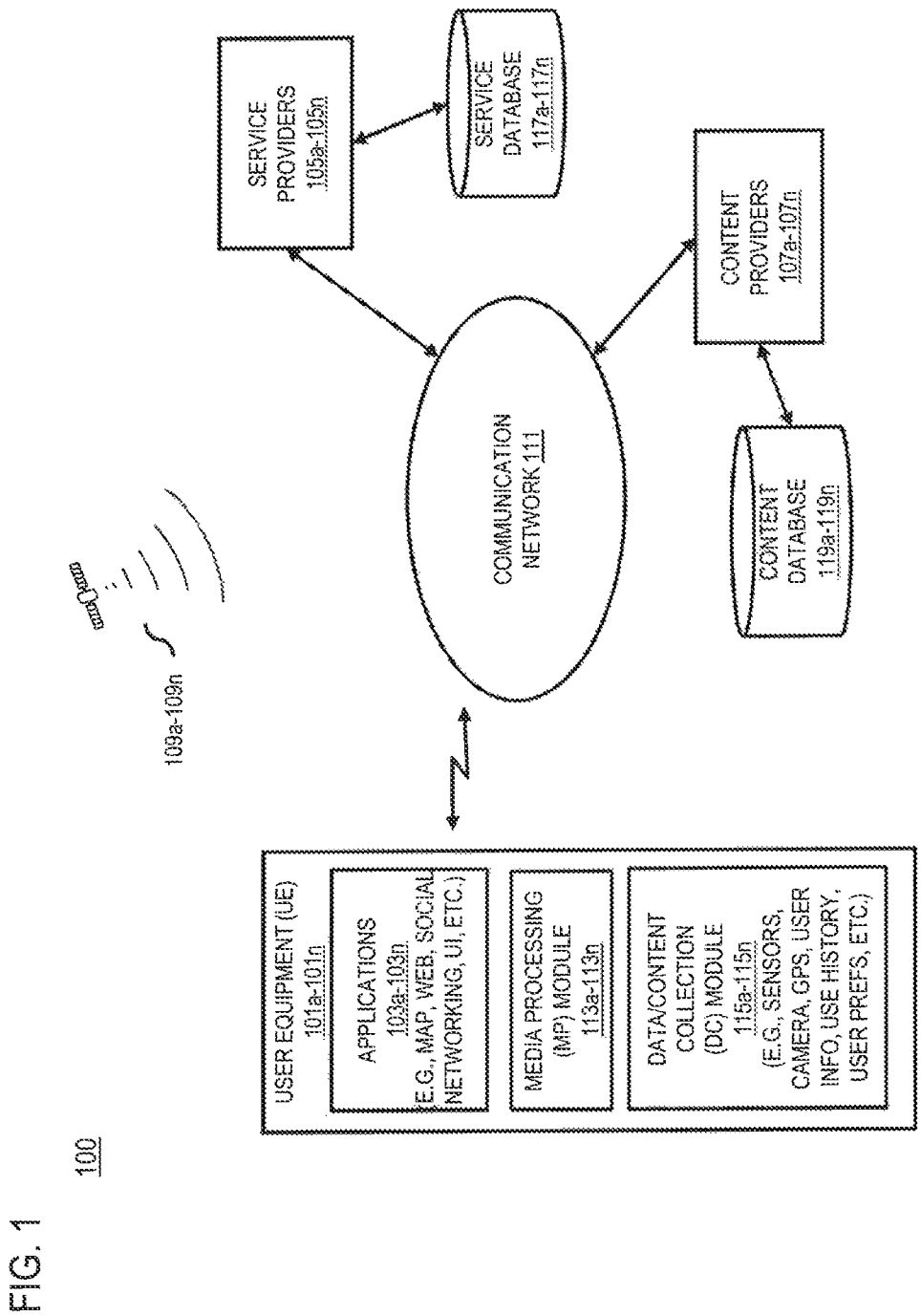
FIG. 1 is a diagram of a system capable of accurate processing and registering of media content for rendering in 3D maps or other applications, according to one embodiment.

Examples of a method, apparatus, and computer program for accurate processing and registering of media content for rendering in 3D maps or other applications are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Different types of geo-location metadata, such as GPS location and local camera poses are used by media presentation applications and services in rendering media content via augmented reality (AR) or virtual reality (VR) methods. For instance, an image of a point of interest (POI) captured by a user may be integrated or superimposed in presenting geo-location of the POI in a map. For example, an image of a certain street scene including people, cars, buildings, etc. may be projected onto a 3D model of that street scene available in a 3D map application, wherein the 3D model may be constructed from a number of sources, for example, a Light Detection and Ranging (LIDAR) point cloud, a photograph, a public database, or the like. However, a 3D constructed model of a certain scene may include inaccuracies where certain details of a 3D object (e.g., windows of a building) in the scene may be not exact or that the 3D model may be missing certain objects (e.g., people, cars, trees, etc.) that may be present in an image/video of that scene. Also, in some cases, location information of a camera/device that captured an image of a scene may be utilized and rendered in the map as a virtual camera, which may allow for user interaction and manipulation of the presentation of the map. For example, the user may change perspective of the virtual camera for viewing from different virtual locations in the map. In one scenario, 3D maps provide added information in the form of depth and elevation as well as offering more freedom in viewing the map by freely moving the virtual camera. However, while reconstructing image or video camera poses is possible, visualizing the media content in a meaningful and aesthetically pleasing manner remains challenging since, for example, image visualization methods used in 2D maps do not readily extend to 3D maps. In some scenarios, geo-located images may be visualized in a 3D map context by projecting a selected set of images on the 3D map data and blending them according to viewing parameters so that a coherent and interactive 3D view can be presented to the user. Still, some or portions of the underlying 3D geometry can be noticeably inaccurate when compared to details of the images, which can result in visual artifacts as the projected images may be misaligned due to lack of depth information. In other instances, 3D geometry data for some geo-locations may not be available at all.

To address this problem, a system 100 of FIG. 1 introduces the capability for accurate processing and registering of media content for rendering in 3D maps and other applications. In various embodiments, one or more user images and videos can be rendered as projected "spotlights" on a 3D map composited in real time based on viewing angle and distance. For instance, a view of a scene with a plurality of image spotlights may be presented via a 3D map application where the spotlights may expand when moving closer to the images. In one embodiment, the spotlights are dynamically adjusted so to show or to be associated with a part of an image that may be shown without substantial distortion. As the images are rendered directly on the map, rather than floating above ground level, it would be easy to see the subject of each image where the overall view of the map can remain uncluttered. Additionally, transitioning between the images would be smooth and seamless. For example, when the virtual camera is substantially at the same location as the original camera was then the image can be fully visible. In one instance, when the virtual camera moves away, then the image may gradually fade away so that the part of the image best aligned with the underlying 3D map may be the last to remain visible.

In one instance, a rendering of images or video clips may be implemented by using deferred shading and projective texturing. For example, while rendering a 3D map in a traditional manner, a processor/algorithm (e.g., a graphics processor) on a user device can capture a depth buffer of a map scene into an OpenGL (an application programming interface (API)) frame buffer object or a Direct3D (an API) surface. In one embodiment, various number of user images can be rendered as 3D image volumes with volume geometry reconstructed from the user device/camera parameters deduced at the image registration stage. Additionally, for each pixel covered by the image volume, the depth buffer in a pixel shader may be utilized to reconstruct its 3D coordinates and compute its location within the projected image. More specifically, it can be determined as to which pixel from the user image projects onto each pixel of the rendered 3D map.

Further, having computed the image pixels corresponding to 3D map pixels, the processor/algorithm can compute the angle between the rays from the 3D pixel location to the original camera location and the current virtual camera location. Furthermore, the computed angle information can be used to calculate/update an accumulated confidence value of a pixel and control the blending of the pixels of an image with the 3D map. In one scenario, the smaller the angle between the original and virtual camera rays, the more the image may contribute to a confidence value and, therefore, to a final rendering. Conversely, the greater the angle between the surface normal and the original camera ray, the smaller the contribution to the confidence value and, therefore, to a final rendering. In other words, when a pixel is being viewed from exactly the same direction as it was originally photographed/captured from, it is opaque. Alternatively, when the pixel is being viewed some threshold angle away from the original shooting direction, then it becomes transparent; and in an in-between scenario, the pixel transparency is interpolated between those two extremes.

In some scenarios, when rendering images at a device, depth offset values pertaining to display locations at the user device may be generated and maintained in a depth offset value buffer. In one embodiment, one or more low-resolution candidate images may be rendered based on jittered depth offset values and, at least, a subset of input images. Additionally, the system 100 may compare the rendering results the candidate images and update the depth offset value buffer with the jittered offset values that produce a most coherent image for each screen location at the device. Moreover, a high-resolution output image may be rendered while offsetting the main depth value at each pixel with the updated depth offset values. In one embodiment, the depth offset value buffer may be maintained in a graphics processing unit's memory portion so that it can be dynamically combined with the depth values stored in the depth buffer. In one example, the depth offset value buffer may be low-resolution so that each pixel contains an 8-bit offset value for a block of 4×4 screen pixels. In one scenario, the jittered depth offset values may be generated randomly, by offsetting the existing depth offset values by fixed amounts, by sampling depth offsets from neighboring pixels, or the like.

In one embodiment, multiple candidate images may be generated using different subsets of the images that can be analyzed for rendering characteristics, e.g., coherence. In another embodiment, a plurality of complete images may be rendered, where rendering coherence may be analyzed per pixel and stored in a side channel of the candidate image. In some instance, the coherence analysis may include comparing individual pixel red-green-blue (RGB) values (e.g., if rendering only one candidate image), or it may include comparing a larger block of pixels in each candidate image and calculating, for example, a root-mean-square error across the pixels. In one example, the analysis may run on the GPU, by reading the candidate images and their respective depth offset values as input, and updating the main depth offset buffer as output.

In one embodiment, the input images or the candidate images may be blurred using, e.g., a Gaussian filter, so that high-frequency details therein may have less impact on the coherence analysis. In one scenario, the depth offset buffer may persistent across a plurality of frames, so that the values may be iteratively refined over time. In one instance, during rapid camera motion, the depth offset values may be back-projected into the 3D scene from a previous viewpoint, which may then be rendered back from the new viewpoint so that the buffer contents stay consistent with the 3D view. In one embodiment, instead of depth offset values, absolute depth values may be used, which may be via transforming the depth buffer at each frame to accommodate for camera motion.

It is noted that the above methods applied to photographs can be readily extended to a video content with the additional feature that a video content may be animated in real time based on the reconstructed 3D motion track of the video clip. The "video spotlight" may then move on the 3D map, and fade in and out depending on its proximity to the current viewing position.

Blending between multiple (e.g., overlapping) images and videos can be achieved by either using basic alpha blending and sorting the images/videos by the distances of their original camera locations from the current viewpoint, or using the destination alpha channel to sum the contributions of each. It is possible that the latter approach may be less sensitive to a rendering order, but can also benefit from sorting.

In one embodiment, the system 100 is capable of automatically locating the camera pose for an image or a video recording in a GPS (e.g., from metadata) so when a user captures or uploads an image/video, the system can determine the location where it was taken and the accurate camera position of each image or video frame, which may be used for presentation in a 3D rendering application.

In one scenario, the system 100 may process an image (e.g., photographs, image streams, videos, pictures, etc.) to determine various elements within the image, wherein the elements may include buildings, landmarks, or other POIs. In some embodiments, the location information of the elements may have been previously embedded in the image, or the location information may be determined from further processing of the image data.

In one embodiment, data about accuracy of a 3D model may be utilized to constrain a range of "good" viewing angles. In one embodiment, content of an image or a video frame may be analyzed in order to rule out any out-of-focus regions in the image/video.

In one embodiment, the system 100 may determine at least one first pixel of at least one image that geometrically corresponds to at least one second pixel of at least one rendered three-dimensional map. In one embodiment, a graphics processor at a user device (e.g., a mobile device) may process one or more images, of an object, available at the device or available from one or more external sources (e.g., a content provider), wherein the processing includes determining if at least one first pixel of the one or more images geometrically correspond to at least one second pixel of at least one rendered three-dimensional model of the object in a map. For example, a user may have an image of a POI (e.g., a building) on a user device, and he may wish to view that image via a presentation in a 3D map application, wherein a processor in the user device may process the pixels of the image to determine if they geometrically correspond to pixels of a model of the POI rendered in the map application.

In one embodiment, the system 100 may process and/or facilitate a processing of (a) the at least one first pixel; (b) the at least one second pixel; (c) metadata associated with at least one of the at least one first pixel and the second pixel; or (d) a combination thereof to determine at least one confidence value, wherein the at least one confidence value is indicative of an estimated level of geometric distortion resulting from projecting the at least one first pixel onto the at least one second pixel. In one embodiment, the metadata associated with a first image and/or a first pixel may include location information of the first image and/or the pixel, wherein the location information may be in reference to a local or a global position coordinate system. Further, the location information of the first pixel can be utilized to compare to location information of a pixel of a second image for determining how well the two pixels may align once the first pixel is projected onto the second pixel. Furthermore, a confidence value may be calculated to indicate a distortion when the first pixel is projected onto the second pixel. In various embodiments, calculation of a confidence value may be based, at least in part, on incident (image ray to surface) and view (image ray to virtual camera ray) angles, projected image resolution (e.g., of a first image), direct measurements of image distortion, for example, partial derivatives of the coordinates of a projected image, or the like.

In one embodiment, the system 100 may determine whether to cause, at least in part, a rendering of the at least one first pixel onto the at least one rendered three-dimensional map based, at least in part, on the confidence value. In one scenario, a processor at a user device may utilize the confidence value for determining whether to use a pixel of a first image for projecting onto a pixel of a second image. For example, a first pixel with a lower confidence value may indicate a distortion if it is projected onto a second pixel of a 3D image/model.

In one embodiment, the system 100 may determine at least one user interaction with the at least one rendered three-dimensional map. In one scenario, a user may utilize UI features at a user device for interacting with a rendering of a 3D map application at the user device, wherein the user may wish to manipulate a virtual perspective in the map; for example, from a different angle, different distance, different height, etc. In one embodiment, the at least one user interaction results in a change in (a) at least one virtual camera location for the at least one rendered three-dimensional map, (b) at least one rendering characteristic for at least one of the at least one first pixel, the at least one image, the at least one second pixel, and the at least one rendered three-dimensional map; or (c) a combination thereof; and wherein the at least one rendering characteristics includes, at least in part, a fade parameter, a toggle parameter, a size parameter, or a combination thereof.

In one embodiment, the system 100 may cause, at least in part, a dynamic updating of the at least one confidence value, the rendering of the at least one first pixel onto the at least one rendered three-dimensional map, or a combination thereof based, at least in part, on the at least one user interaction. For instance, the user interaction may cause a viewing of a POI in the map from a different angle, wherein the different viewing angle can cause the pixels of a first image to be in different alignments with pixels of a second image/model rendered in the map. In one embodiment, a processor may update a confidence value for rendering/projecting first pixels of a first image onto second pixels of a second image based on changes caused by a user interacting with the renderings in a 3D application.

In one embodiment, the processor can determine a camera depth of field (e.g., from EXIF data) and/or analyze contents of a plurality of images to identify blurred regions in each image to further modulate and update the associated confidence values, e.g., which may result in the presentation of substantially sharp regions of each image.

In one embodiment, the system 100 may cause, at least in part, a comparison of the at least one confidence value against at least one threshold confidence criterion to determine whether to cause, at least in part, the rendering of the at least one first pixel onto the at least one rendered three-dimensional map. In various embodiments, the threshold confidence criterion may be based, at least in part, on geometrical precision of a 3D model (e.g., from metadata), an analysis of image content metadata for determining blurry or sharp regions in the image, or the like. In one scenario, if a confidence value of a pixel is below a threshold confidence criterion, then a processor at a user device may decide to not use that pixel for projecting onto another pixel for presentation in an application. For example, if the confidence value for a first pixel is below the threshold, then it may be indicative that use of that first pixel may cause a blurry rendering if projected onto a second target pixel. In various embodiments, a threshold confidence criterion may be determined by one or more applications at a user device, a user of the device, a content/service provider, resources and capabilities at the user device, or the like. In one embodiment, a high confidence value may indicate an opaque pixel, and a low confidence value may indicate a transparent pixel.

In one embodiment, the system 100 may process and/or facilitate a processing of the metadata to determine at least one first camera location associated with the at least one image and at least one second camera location associated with the at least one rendered three-dimensional map. In one scenario, metadata associated with one or more images may be utilized for determining location information of one or more cameras that was used in capturing the one or more images. For example, the metadata may indicate location information indicative of X, Y, and Z locations in a Cartesian coordinate system.

In one embodiment, the system 100 may determine at least one offset between the at least one first camera location and the at least one second camera location, wherein the at least one confidence value is further based, at least in part, on the offset. In one scenario, the location information of the one or more cameras is used to determine offsets between the cameras; for example, offsets in the X, Y, or Z directions. Further, the offset information can be utilized to update a confidence value associated with a plurality of pixels in a plurality of images. For example, a high offset value between two cameras may cause a lower confidence value associated with pixels or images captured by those cameras.

In one embodiment, the system 100 may determine at least one first ray extending from the at least one first camera location to at least one pixel location of at least one of the at least one first pixel and the at least one second pixel. In one scenario, location information in metadata associated with a camera may be used to determine a first ray (e.g., line of sight) from the camera position to location of a first pixel of a first image and a second pixel of a second image or a model associated with the second image. For example, coordinates (e.g., X, Y, and Z location information) of the camera may be compared to the coordinates (e.g., X, Y, and Z location information) of a pixel in an image of a building to determine the first ray. In one scenario, a ray with reference to a pixel at a ground level near the camera location may be determined by using the location information of the camera and comparing it to location information at ground level. In one embodiment, the ray may be determined with reference to a pixel associated with an image of a POI captured by the first camera.

In one embodiment, the system 100 may determine at least one second ray extending from the at least one second camera location to the at least one pixel location. In one embodiment, location information associated with a second camera location (e.g., a virtual camera location) may be utilized to determine a second ray between the second camera and the pixel location associated with the image or a model rendered in an application. In one scenario, the second camera location may be determined from user interaction with a rendering of an image or POI in a 3D map application.

In one embodiment, the system 100 may determine at least one angle formed between the at least one first ray and the at least one second ray, wherein the confidence value is determined based, at least in part, on the at least one angle. In one embodiment, a first ray from a first camera extending to a pixel may be compared with a second ray from a second camera extending to the pixel to determine an angle between the first ray and the second ray. In one embodiment, a plurality of rays from the first camera may be compared with a plurality of rays from the second camera to determine a plurality of angles between the first rays and second rays.

In one embodiment, the system 100 may determine at least one transparency level for the rendering of the at least one pixel onto the at least one rendered three-dimensional map based, at least in part, on an accumulated confidence value. In one example, confidence values for pixels from various images of an object that are to be projected onto a pixel of a model of the object are accumulated in an accumulation buffer. In one embodiment, the at least one transparency level decreases with an increase in the accumulated confidence value. In one embodiment, a confidence value lower than a confidence threshold value may indicate a transparent pixel.

In one embodiment, the system 100 may determine that the at least one image includes a plurality of overlapping images. In one scenario, one or more images of a POI may be utilized and overlapped onto another image or a model of the POI rendered in an application. For example, several images of a certain building may be used by a 3D map application for overlapping with a 3D model of that same building rendered in the map application.

In one embodiment, the system 100 may cause, at least in part, a sorting, a blending, or a combination thereof of the plurality of overlapping images based, at least in part, on the confidence value. In one scenario, a plurality of images of a POI may have been captured by a plurality of cameras where those images may be overlapped onto a model/image of the POI rendered in an application, for example, in a 3D map application. In one example, each pixel of each image may be blended according to the confidence value or the confidence threshold criterion associated with each pixel. The blending results may be improved by rendering the images sorted based on camera locations, so that the contributions from different images are added to the accumulation buffer in an order that is favorable for the blending function used.

In one embodiment, wherein the at least one image includes at least one video, the system 100 may determine at least one three-dimensional motion track for the at least one video, wherein the at least one confidence value, the rendering of the at least one pixel onto the at least one rendered three-dimensional map is based, at least in part, on the at least one three-dimensional motion track. In one scenario, a media content associated with a POI may be a video clip that is to be used in overlapping onto another media content (e.g., an image) or model of the POI in a rendering application. For example, a user may have a video of a certain city center, which he would like to view as rendered in a 3D map application. In one embodiment, a processor at a user device where the application is to rendered, may process the video clip and/or its metadata for determining a three-dimensional motion track for the video clip. Further, a confidence value or the rendering of one or more pixels onto a rendered three-dimensional map may be based on the three-dimensional motion track. For example, as a user or an application at a user device may interact and move the rendering of the video clip in a virtual presentation in a 3D map application, the confidence value of rendering of pixels of the video clip may be updated based on the 3D motion track. For instance, the rendering may be blurry in one frame and clear in another frame.

In one embodiment, the system 100 may cause, at least in part, an estimation of at least one depth offset value for the at least one image with reference to the second camera location. In various embodiments, the system 100 may utilize an algorithm to estimate a depth offset value based on a predetermined set of values, step values, or random values. For example, a predetermined set of values may include a depth offset of one meter, few inches, one foot, or the like, which may be a distance offset between the location of the first image and the second camera. In one instance, the depth offset may be a distance offset from the scene geometry towards or away from location of a virtual rendering camera.

In one embodiment, the system 100 may cause, at least in part, an iterative updating of a depth offset value buffer with at least one estimated depth offset value. In one embodiment, a depth offset value buffer may be updated with one or more iterative depth offset value estimations. In one example, the depth offset value buffer may be a low-resolution, high-resolution, or the like buffer, which may store depth offset values associated with various block sizes (e.g., 8×8 pixel block) of an image.

In one embodiment, the system 100 may render of the at least one image onto the at least one rendered three-dimensional map is based, at least in part, on the at least one depth offset value. In one embodiment, the system 100 may render of the at least one image onto the at least one rendered three-dimensional map is based, at least in part, on the at least one user interaction and the at least one depth offset value. In one embodiment, a subsequent rendering of one or more images or one or more portions of the one or more images may be a rendering of a next frame onto a screen location that is based on the one or more depth offset values from the previous rendering (e.g., depth offset value) and one or more new camera locations, e.g., the first camera, the second camera, or the like.

In one embodiment, the system 100 may cause, at least in part, a generating of at least one new candidate depth offset value for the at least one image with reference to the second camera location. In various embodiments, the system 100 may utilize an algorithm to estimate one or more new depth offset values, which may be based on previous values stored at the depth offset value buffer, size of the depth offset value buffer, a current rendering frame of an image, neighboring/adjacent depth values, a predetermined set of values, step values, or random offsets. In one instance, scene geometry data from a buffer storage and depth offset values from a depth offset value buffer may be utilized in generating the new candidate depth offset values.

In one embodiment, the system 100 may cause, at least in part, a first rendering of at least one test image onto the at least one rendered three-dimensional map based, at least in part, on the at least one depth offset value, which may include scene geometry data, projected image texture data, and depth offset values. Further, in one embodiment, the system 100 may cause, at least in part, a second rendering of the at least one test image onto the at least one rendered three-dimensional map based, at least in part, on the at least one new candidate depth offset value. In one instance, the same image or portion of the image may be rendered by utilizing the new candidate values.

In one embodiment, the system 100 may cause, at least in part, an analysis of the first rendering and the second rendering to determine one or more rendering characteristics associated with the first rendering and the second rendering. In one embodiment, results of the analysis may be utilized to determine a quality, coherence or matching of the renderings of the images based on the previous depth offset values and the new candidate depth offset values. For example, a rendering of an image with an offset of one meter may be compared to a rendering of the image with an offset of three meters. In one embodiment, the renderings and the analysis may be of a portion of an image (e.g., a block of pixels). In one embodiment, the system 100 may cause, at least in part, an updating of the depth offset value buffer with the at least one depth offset value or the at least one new candidate depth offset value based, at least in part, on the analysis. In one example, the new candidate values selected for updating may be based on a number of iterations and the analysis results.

As shown in FIG. 1, in one embodiment, the system 100 includes user equipment 101a-101n (also collectively referred to as UE 101 and/or UEs 101), which may be utilized to execute one or more applications 103a-103n (also collectively referred to as applications 103) including social networking, web browser, content sharing, multimedia applications, augmented reality (AR), virtual reality (VR), user interface (UI), map application, web client, etc.

Additionally, the applications 103 may facilitate communication with other UEs 101, one or more service providers 105a-105n (also collectively referred to as service providers 105), one or more content providers 107a-107n (also collectively referred to as content providers 107), one or more GPS satellites 109a-109n (also collectively referred to as GPS satellites 109), and/or with other components of the system 100 directly and/or via communication network 111. In one embodiment, the UEs 101 may include media processing module 113a-113n (also collectively referred to as MP module 113), and data/content collection modules 115a-115n (also collectively referred to as DC module 115).

In one embodiment, an MP module 113 may utilize one or more algorithms for processing an image/video available to the UE 101. In some embodiments, the MP module 113 may be implemented in the applications 103, e.g., in a map application. In addition or alternatively, the MP modules 113 may be independent processes executing at the UEs 101.

In one embodiment, the MP module 113 may utilize one or more algorithms to perform one or more functions associated with processing one or more images to determine camera location information and/or camera pose information, wherein the information may be represented according to a global coordinate system, thereby causing, at least in part, an association of these information with the one or more images as meta-data information. In one embodiment, the MP module 113 may process one or more pixels associated with the one or more images for determining one or more properties associated with the pixels, the images, or the like.

In one embodiment, the DC module 115 may be used for determining and/or collecting data and/or content associated with the UEs 101, one or more users of the UEs 101, applications 103, one or more media content items (e.g., multimedia content), and the like. In addition, a UE 101 can execute an application 103 that is a software client for storing, processing, and/or forwarding one or more information items to other components of the system 100.

In one embodiment, the service providers 105 may include and/or have access to one or more service databases 117a-117n (also collectively referred to as service database 117), which may include various user information, user profiles, user preferences, one or more profiles of one or more user devices (e.g., device configuration, sensors information, etc.), service providers 105 information, other service providers' information, and the like. In one embodiment, the service providers 105 may include one or more service providers offering one or more services, for example, online shopping, social networking services (e.g., blogging), content sharing, media upload, media download, media streaming, account management services, or a combination thereof.

In one embodiment, the content providers 107 may include and/or have access to one or more content database 119a-119n (also collectively referred to as content database 119), which may store, include, and/or have access to various content items. For example, the content providers 107 may store content items (e.g., at the content database 119) provided by various users, various service providers, crowd-sourced content, and the like. Further, the service providers 105 and/or the content providers 107 may utilize one or more service application programming interfaces (APIs)/integrated interface, through which communication, notifications, updates, content, and information (e.g., associated with users, applications, services, content, etc.) may be shared, accessed and/or processed.

By way of example, the service provider 105 or the content provider 107 may provide any number of services (e.g., mapping services, social networking services, media services, content services, etc.) via a web server or other means of communications (e.g., text messaging, voice, instant messaging, chat, etc.)

The UEs 101 may be any type of mobile terminal, fixed terminal, or portable terminal including a mobile handset, station, unit, device, healthcare diagnostic and testing devices, product testing devices, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, loud speakers, display monitors, radio broadcast receiver, electronic book device, game device, wrist watch, or any combination thereof, including the accessories and peripherals of these devices, or any combination thereof. It is also contemplated that the UEs can support any type of interface to the user (such as "wearable" circuitry, etc.) Further, the UEs 101 may include various sensors for collecting data associated with a user, a user's environment, and/or with a UE 101, for example, the sensors may determine and/or capture audio, video, images, atmospheric conditions, device location, user mood, ambient lighting, user physiological information, device movement speed and direction, and the like.

In one embodiment, the UE 101 includes a location module/sensor that can determine the UE 101 location (e.g., a user's location). The UE 101 location may be determined by a triangulation system such as a GPS, assisted GPS (A-GPS), Cell of Origin, wireless local area network triangulation, or other location extrapolation technologies. Standard GPS and A-GPS systems can use the one or more satellites 109 to pinpoint the location (e.g., longitude, latitude, and altitude) of the UE 101. A Cell of Origin system can be used to determine the cellular tower that a cellular UE 101 is synchronized with. This information provides a coarse location of the UE 101 because the cellular tower can have a unique cellular identifier (cell-ID) that can be geographically mapped. The location module/sensor may also utilize multiple technologies to detect the location of the UE 101. GPS coordinates can provide finer detail as to the location of the UE 101. In another embodiment, the UE 101 may utilize a local area network (e.g., LAN, WLAN) connection to determine the UE 101 location information, for example, from an Internet source (e.g., a service provider).

By way of example, the communication network 111 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the UEs 101, the service providers 105, and the content providers 107 may communicate with each other and other components of the communication network 111 using well known, new or still developing protocols. In this context, a protocol includes a set of rules defining how the network nodes within the communication network 111 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

In one embodiment, the UEs 101, the service providers 105, and the content providers 107 may interact according to a client-server model. It is noted that the client-server model of computer process interaction is widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others. It is also noted that the role of a client and a server is not fixed; in some situations a device may act both as a client and a server, which may be done simultaneously and/or the device may alternate between these roles.

Figure 2:
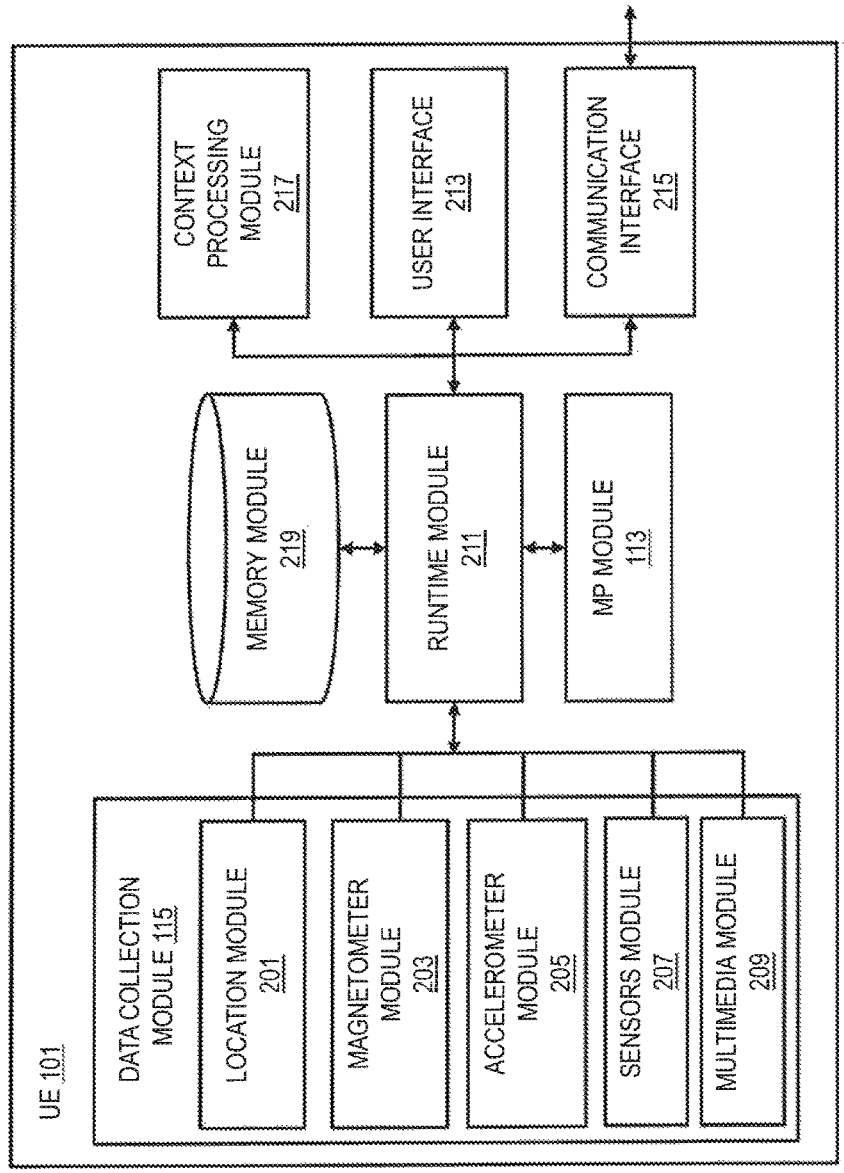
FIG. 2 is a diagram of the components of a user equipment capable of accurate processing and registering of media content for rendering in 3D maps or other applications, according to one embodiment.

FIG. 2 is a diagram of the components of a user equipment capable of accurate processing and registering of media content for rendering in 3D maps or other applications, according to an embodiment. By way of example, a UE 101 includes one or more components for receiving, generating, capturing, or processing media content and rendering the media content via the applications 103 at a UE 101. It is contemplated that the functions of these components may be combined in one or more components or performed by other components of equivalent functionality. In this embodiment, the UE 101 includes a DC module 115 that may include one or more location modules 201, magnetometer modules 203, accelerometer modules 205, sensors module 207, and multimedia module 209. Further, the UE 101 may also include a runtime module 211 to coordinate the use of other components of the UE 101, the MP module 113, a user interface 213, a communication interface 215, a context processing module 217, and a memory module 219. The applications 103 of the UE 101 can execute on the runtime module 211 utilizing the components of the UE 101.

The location module 201 can determine a user's location, for example, via location of a UE 101. The user's location can be determined by a triangulation system such as GPS, assisted GPS (A-GPS), Cell of Origin, or other location extrapolation technologies. Standard GPS and A-GPS systems can use satellites 109 to pinpoint the location of a UE 101. A Cell of Origin system can be used to determine the cellular tower that a cellular UE 101 is synchronized with. This information provides a coarse location of the UE 101 because the cellular tower can have a unique cellular identifier (cell-ID) that can be geographically mapped. The location module 201 may also utilize multiple technologies to detect the location of the UE 101. Location coordinates (e.g., GPS coordinates) can give finer detail as to the location of the UE 101 when media is captured. In one embodiment, GPS coordinates are stored as context information in the memory module 219 and are available to the context processing module 217, the DC module 115, the service providers 105, and/or to other entities of the system 100 (e.g., via the communication interface 215.) Moreover, in certain embodiments, the GPS coordinates can include an altitude to provide a height. In other embodiments, the altitude can be determined using another type of altimeter. In certain embodiments, the location module 201 can be a means for determining a location of the UE 101, an image, or used to associate an object in view with a location.

The magnetometer module 203 can be used in finding horizontal orientation of the UE 101. A magnetometer is an instrument that can measure the strength and/or direction of a magnetic field. Using the same approach as a compass, the magnetometer is capable of determining the direction of a UE 101 using the magnetic field of the Earth. The front of a media capture device (e.g., a camera) can be marked as a reference point in determining direction. Thus, if the magnetic field points north compared to the reference point, the angle the UE 101 reference point is from the magnetic field is known. Simple calculations can be made to determine the direction of the UE 101. In one embodiment, horizontal directional data obtained from a magnetometer can be stored in memory module 219, made available to other modules and/or applications 103 of the UE 101, and/or transmitted via the communication interface 215 to one or more entities of the system 100.

The accelerometer module 205 can be used to determine vertical orientation of the UE 101. An accelerometer is an instrument that can measure acceleration. Using a three-axis accelerometer, with axes X, Y, and Z, provides the acceleration in three directions with known angles. Once again, the front of a media capture device can be marked as a reference point in determining direction. Because the acceleration due to gravity is known, when a UE 101 is stationary, the accelerometer module 205 can determine the angle the UE 101 is pointed as compared to Earth's gravity. In certain embodiments, the magnetometer module 203 and accelerometer module 205 can be means for ascertaining a perspective of a user. This perspective information may be stored in the memory module 219, made available to other modules and/or applications 103 of the UE 101, and/or sent to one or more entities of the system 100.

In various embodiments, the sensors module 207 can process sensor data from various sensors (e.g., GPS, accelerometer, gyroscope, thermometer, etc.) to determine environmental (e.g., atmospheric) conditions surrounding the UE 101, user mood (e.g., hungry, angry, tired, etc.), location information, and various other information from a range sensors that may be available on one or more devices. For example, the sensors module 207 may detect conditions including humidity, temperature, geo-location, biometric data of the user, etc. Once again, this information can be stored in the memory module 219 and sent to the context processing module 217 and/or to other entities of the system 100. In certain embodiments, information collected from the DC collection module 115 can be retrieved by the runtime module 211 and stored in memory module 219, made available to other modules and/or applications 103 of the UE 101, and/or sent to one or more entities of the system 100.

In certain embodiments, the sensors module 207 may include, for example, a camera/imaging sensor for gathering image data, an audio recorder for gathering audio data, a global positioning sensor for gathering location data, a network detection sensor for detecting wireless signals or network data, temporal information and the like. In one scenario, the camera sensors may provide the users of UE 101 with 3D pose estimation, tracking and clustering functions for suitable camera placement. In one scenario, the sensors module 207 may include location sensors (e.g., GPS), light sensors, orientation sensors augmented with height sensor and acceleration sensor, tilt sensors, moisture sensors, pressure sensors, audio sensors (e.g., microphone), or receivers for different short-range communications (e.g., Bluetooth, WiFi, etc.) In one embodiment, the sensors module 207 may detect user interaction with a user interface generated by the UE 101, applications 103, and/or one or more other elements of the system 100. The sensors module 207 may work in conjunction with the system 100, wherein the sensors module 207 may identify a point on the user interface that the user selects, such as by brushing, clicking, or touching the screen of UE 101.

In one embodiment, the multimedia module 209 may be utilized to capture various media items, for example, graphical encoded data representations, images, video, audio, and the like, wherein the captured media may be submitted to one or more modules and applications of the UE 101, a service provider, and/or a content provider to further processing, storage, sharing, and the like. For example, a captured image of a POI may be submitted to a service provider and/or the context processing module 217 for processing.

In one embodiment, the communication interface 215 can be used to communicate with one or more entities of the system 100. Certain communications can be via methods such as an internet protocol, messaging (e.g., SMS, MMS, etc.), or any other communication method (e.g., via the communication network 111). In some examples, the UE 101 can send context information associated with the UE 101 to the service providers 105, content providers 107, and/or to other entities of the system 100.

The user interface 213 can include various methods of communication. For example, the user interface 213 can have outputs including a visual component (e.g., a screen), an audio component, a physical component (e.g., vibrations), and other methods of communication. User inputs can include a touch-screen interface, a scroll-and-click interface, a button interface, a microphone, etc. Input can be via one or more methods such as voice input, textual input, typed input, typed touch-screen input, other touch-enabled input, etc.

The context processing module 217 may be utilized in determining context information from the MP module 113, DC module 115 and/or applications 103 executing on the runtime module 211. This information may be caused to be transmitted, via the communication interface 215, to the service providers 105 and/or to other entities of the system 100. The context processing module 217 may additionally be utilized as a means for determining information related to the user, an instance of data, a value, a content item, an object, a subject, and the like. In certain embodiments, the context processing module 217 can infer higher level context information from the context data such as favorite locations, significant places, common activities, interests in products and services, POIs at various geo-locations, etc.

In various embodiments, the runtime module may cause one or more modules/components of a UE 101 to associate and/or determine one or more available data items with one or more media content items at a UE 101. For example, date, time, location, and user information associated with a device at a particular time may be associated (e.g., as metadata) with a media content item.

In one embodiment, the MP module 113 may extract geo location metadata associated with pixels of an image or a video frame. Such extracted geo location metadata may contain registered image or video frames, corresponding camera poses and reconstructed 3D point clouds defined within, for instance, a local 3D Cartesian coordinate system with known origin and axes. The camera poses and point clouds can be uniquely mapped to a 3D coordinate system or other global coordinate system (e.g., WGS84, UTM, etc.) In one scenario, the MP module 113 may choose a camera pose by matching point cloud, and determining an area in the point cloud matches up to, and then calculating the perspective of the image/video frame to get the camera pose information.

In one embodiment, the MP module 113 may determine image information, which may comprise of but not limited to specification of a photograph exposure set-up parameters, for instance, shooting vantage point, shooting angle, camera settings etc. In one embodiment, the MP module 113 may receive information from the DC module 115 and store the information at the UE 101. Further, the information may be any one of multiple types of information that can provide means for creating a rendering of the information in a contact-based user interface.

Figure 3:
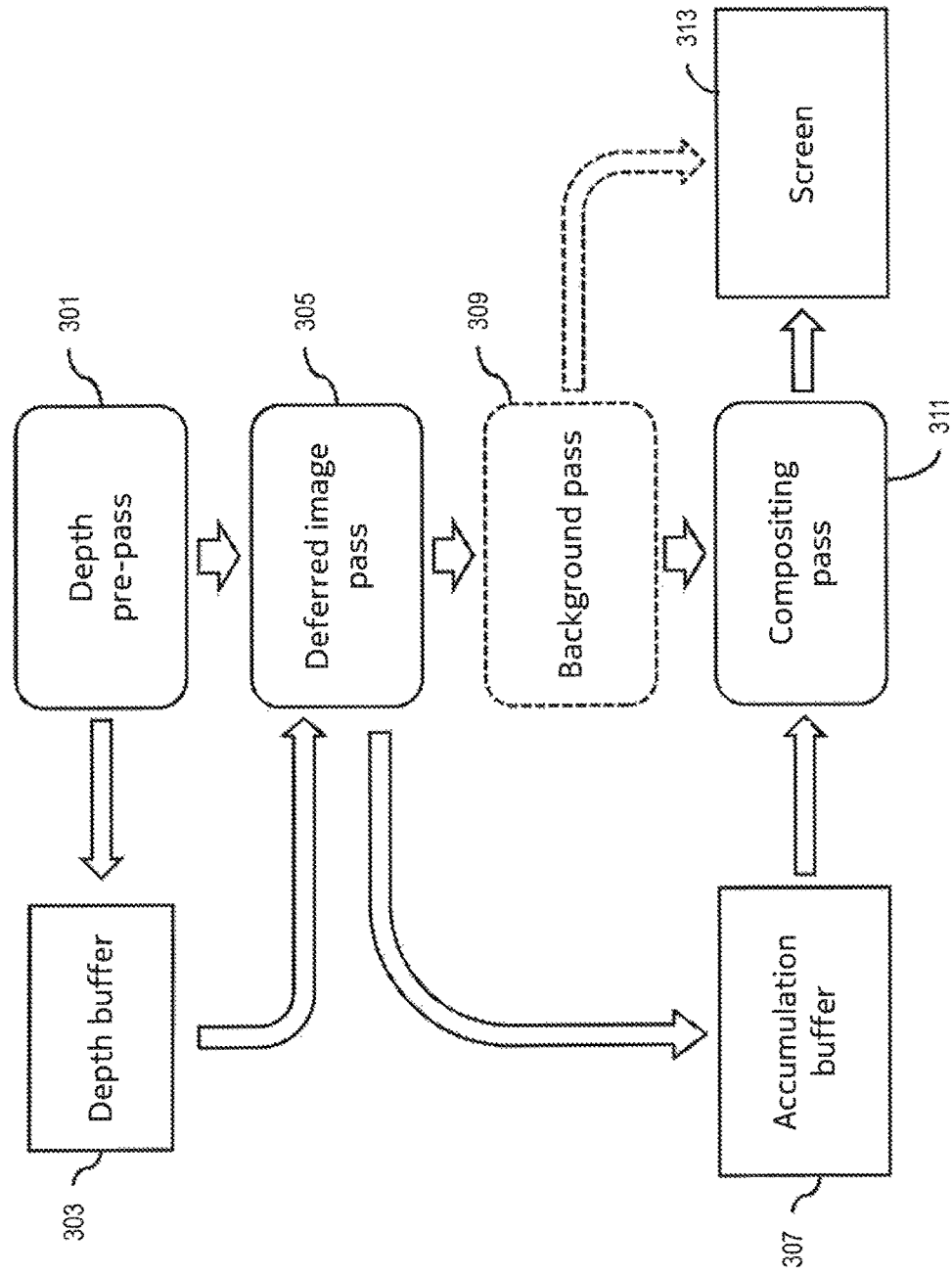
FIG. 3 is an illustration of an overview of a process for processing pixels of a plurality of images for rendering onto a three dimensional model, according to one embodiment.

FIG. 3 is an illustration of an overview of a process for processing pixels of a plurality of images for rendering onto a three dimensional model, according to one embodiment.

In one embodiment, the process 300 begins at 301 where a processor at a UE 101 may render a scene geometry to a depth buffer 303 and, at 305, reconstruct coordinates per pixel of that geometry and blend images to accumulation buffer 307 weighted by a confidence value computed based on viewing angle and other data. Further, at 309 the processor may render a regular scene geometry to a default back buffer. Furthermore, at 311, the processor may normalize the accumulated contributions and alpha-blend to the default back buffer, which at 313 may be presented at the display of the UE 101.

Figure 15:
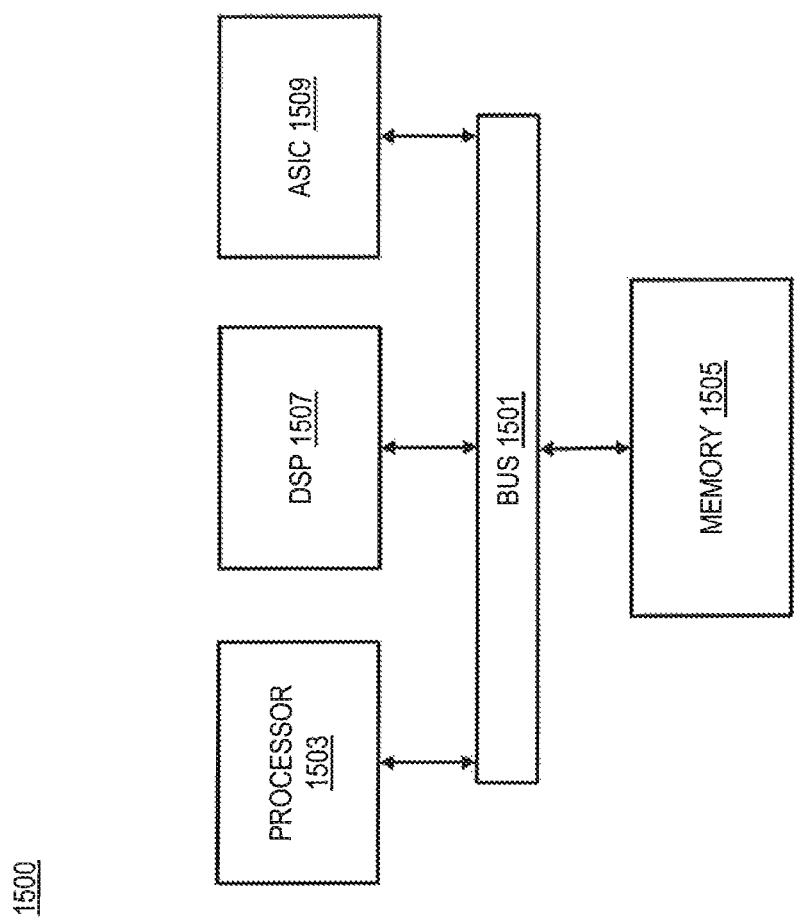
FIG. 15 is a diagram of a chip set that can be used to implement an embodiment of the invention.

FIGS. 4 through 7 are flowcharts for processing pixels of a first image and a second image to determine a confidence value for rendering the first pixels onto a three-dimensional rendering of the second image, according to various embodiments. In various embodiments, an MP module 113 may perform one or more portions of the processes 400, 500, 600, and 700 which may be implemented in, for instance, a chip set including a processor and a memory as shown in FIG. 15. As such, the MP module 113 can provide means for accomplishing various parts of the processes 400, 500, 600, and 700 as well as means for accomplishing other processes in conjunction with other components of the system 100. Throughout these processes, the MP module 113 and/or applications 103 may be referred to as completing various portions of the processes 400, 500, 600, and 700; however, it is understood that other components of the system 100 can perform some of and/or all of the process steps. Further, for clarity in discussing the processes 400, 500, 600, and 700, the MP module 113 is referred to as completing various steps of said processes; however, said processes and/or example steps described therein may be performed in any suitable order and/or may be optional.

Figure 4:
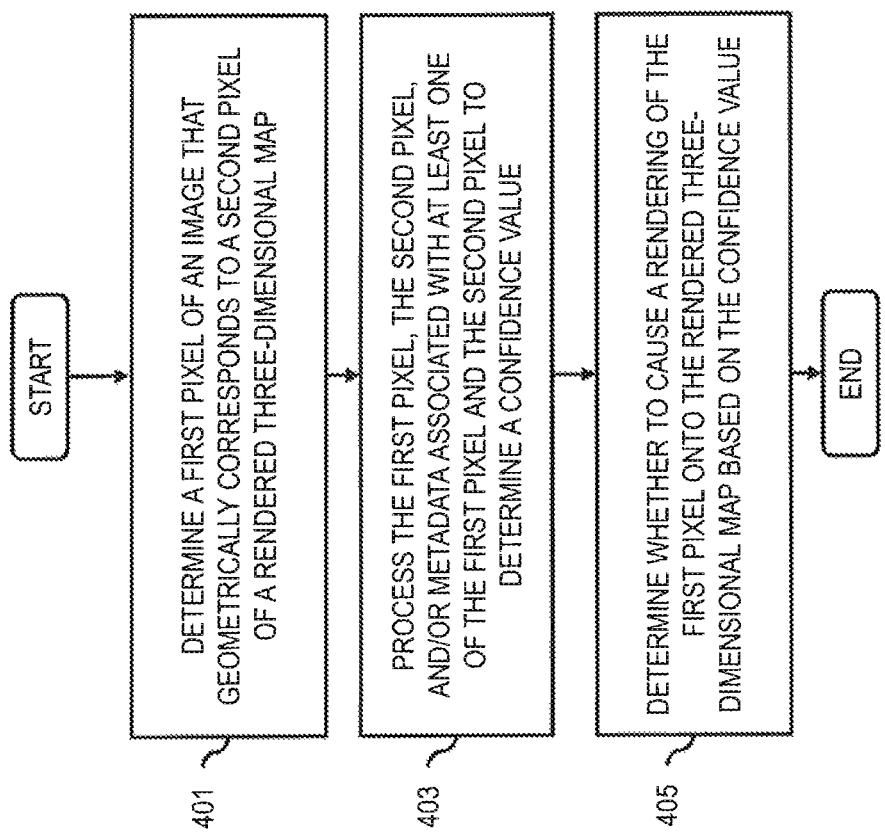

The process 400 may begin at step 401 of the FIG. 4, where the MP module 113 may determine at least one first pixel of at least one image that geometrically corresponds to at least one second pixel of at least one rendered three-dimensional map. In one embodiment, a graphics processor at a user device (e.g., a mobile device) may process one or more images, of an object, available at the device or available from one or more external sources (e.g., a content provider), wherein the processing includes determining if at least one first pixel of the one or more images geometrically correspond to at least one second pixel of at least one rendered three-dimensional model of the object in a map. For example, a user may have an image of a POI (e.g., a building) on a user device, and he may wish to view that image via a presentation in a 3D map application, wherein a processor in the user device may process the pixels of the image to determine if they geometrically correspond to pixels of a model of the POI rendered in the map application.

In step 403, the MP module 113 may process and/or facilitate a processing of (a) the at least one first pixel; (b) the at least one second pixel; (c) metadata associated with at least one of the at least one first pixel and the second pixel; or (d) a combination thereof to determine at least one confidence value, wherein the at least one confidence value is indicative of an estimated level of geometric distortion resulting from projecting the at least one first pixel onto the at least one second pixel. In one embodiment, the metadata associated with a first image and/or a first pixel may include location information of the first image and/or the pixel, wherein the location information may be in reference to a local or a global position coordinate system. Further, the location information of the first pixel can be utilized to compare to location information of a pixel of a second image for determining how well the two pixels may align once the first pixel is projected onto the second pixel. Furthermore, a confidence value may be calculated to indicate a distortion when the first pixel is projected onto the second pixel. In various embodiments, calculation of a confidence value may be based, at least in part, on incident (image ray to surface) and view (image ray to virtual camera ray) angles, projected image resolution (e.g., of a first image), direct measurements of image distortion, for example, partial derivatives of the coordinates of a projected image, or the like.

In step 405, the MP module 113 may determine whether to cause, at least in part, a rendering of the at least one first pixel onto the at least one rendered three-dimensional map based, at least in part, on the confidence value. In one scenario, a processor at a user device may utilize the confidence value for determining whether to use a pixel of a first image for projecting onto a pixel of a second image. For example, a first pixel with a lower confidence value may indicate a distortion if it is projected onto a second pixel of a 3D image/model.

Figure 5:
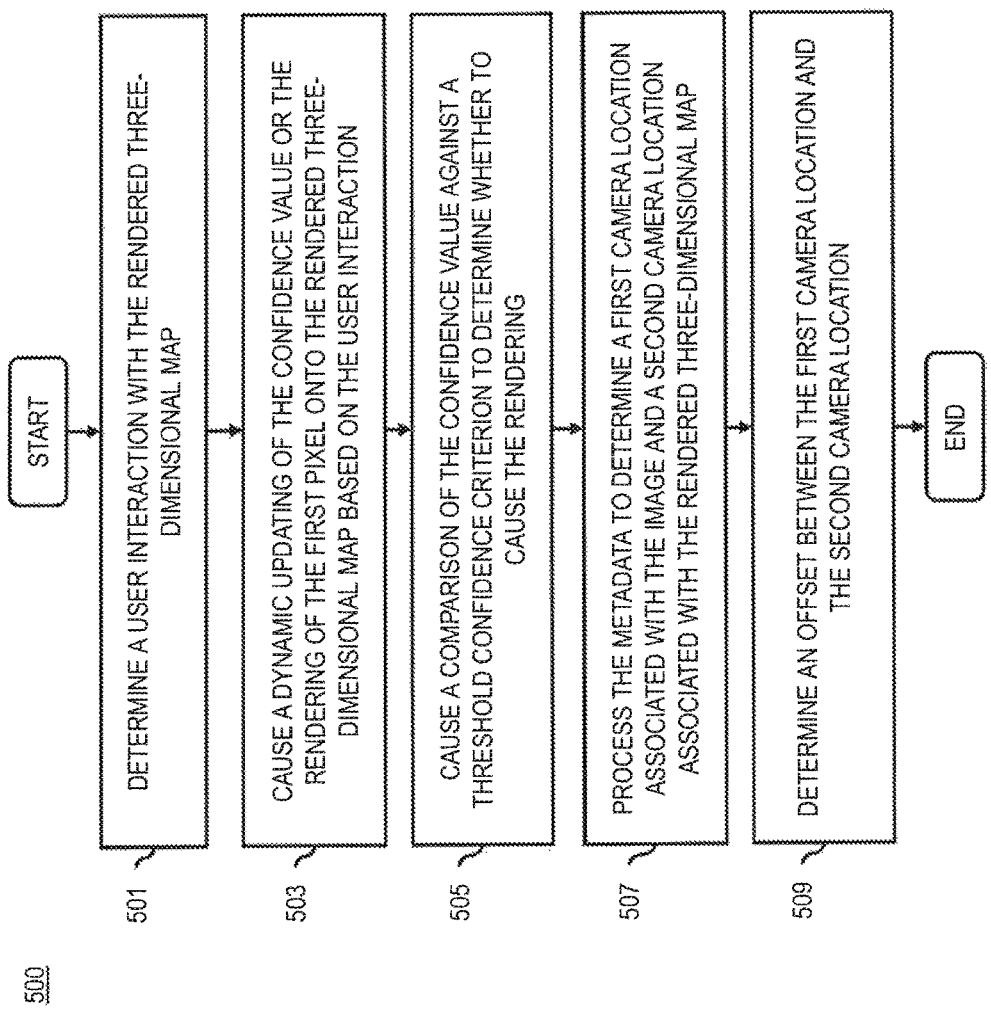

The process 500 may begin at step 501 of the FIG. 5, where the MP module 113 may determine at least one user interaction with the at least one rendered three-dimensional map. In one scenario, a user may utilize UI features at a user device for interacting with a rendering of a 3D map application at the user device, wherein the user may wish to manipulate a virtual perspective in the map; for example, from a different angle, different distance, different height, etc. In one embodiment, the at least one user interaction results in a change in (a) at least one virtual camera location for the at least one rendered three-dimensional map, (b) at least one rendering characteristic for at least one of the at least one first pixel, the at least one image, the at least one second pixel, and the at least one rendered three-dimensional map; or (c) a combination thereof; and wherein the at least one rendering characteristics includes, at least in part, a fade parameter, a toggle parameter, a size parameter, or a combination thereof.

In step 503, the MP module 113 may cause, at least in part, a dynamic updating of the at least one confidence value, the rendering of the at least one first pixel onto the at least one rendered three-dimensional map, or a combination thereof based, at least in part, on the at least one user interaction. For instance, the user interaction may cause a viewing of a POI in the map from a different angle, wherein the different viewing angle can cause the pixels of a first image to be in different alignments with pixels of a second image/model rendered in the map. In one embodiment, a processor may update a confidence value for rendering/projecting first pixels of a first image onto second pixels of a second image based on changes caused by a user interacting with the renderings in a 3D application. In one embodiment, the processor can determine a camera depth of field (e.g., from EXIF data) and/or analyze contents of a plurality of images to identify blurred regions in each image to further modulate and update the associated confidence values, e.g., which may result in the presentation of substantially sharp regions of each image.

In step 505, the MP module 113 may cause, at least in part, a comparison of the at least one confidence value against at least one threshold confidence criterion to determine whether to cause, at least in part, the rendering of the at least one first pixel onto the at least one rendered three-dimensional map. In various embodiments, the threshold confidence criterion may be based, at least in part, on geometrical precision of a 3D model (e.g., from metadata), an analysis of image content metadata for determining blurry or sharp regions in the image, or the like. In one scenario, if a confidence value of a pixel is below a threshold confidence criterion, then a processor at a user device may decide to not use that pixel for projecting onto another pixel for presentation in an application. For example, if the confidence value for a first pixel is below the threshold, then it may be indicative that use of that first pixel may cause a blurry rendering if projected onto a second target pixel. In various embodiments, a threshold confidence criterion may be determined by one or more applications at a user device, a user of the device, a content/service provider, resources and capabilities at the user device, or the like. In one embodiment, a high confidence value may indicate an opaque pixel, and a low confidence value may indicate a transparent pixel.

In step 507, the MP module 113 may process and/or facilitate a processing of the metadata to determine at least one first camera location associated with the at least one image and at least one second camera location associated with the at least one rendered three-dimensional map. In one scenario, metadata associated with one or more images may be utilized for determining location information of one or more cameras that was used in capturing the one or more image. For example, the metadata may indicate location information indicative of X, Y, and Z locations in a Cartesian coordinate system.

In step 509, the MP module 113 may determine at least one offset between the at least one first camera location and the at least one second camera location, wherein the at least one confidence value is further based, at least in part, on the offset. In one scenario, the location information of the one or more cameras is used to determine offsets between the cameras; for example, offsets in the X, Y, or Z directions. Further, the offset information can be utilized to update a confidence value associated with a plurality of pixels in a plurality of images. For example, a high offset value between two cameras may cause a lower confidence value associated with pixels or images captured by those cameras.

Figure 6:
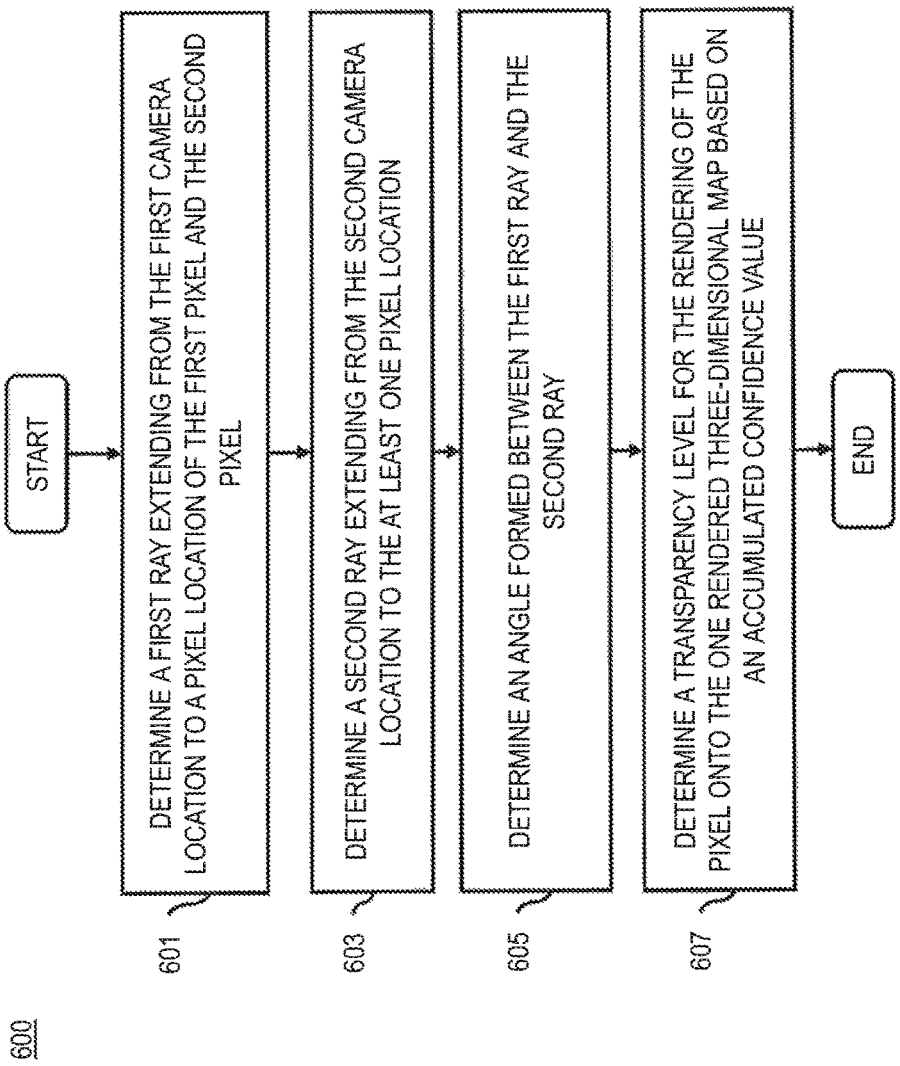

The process 600 may begin at step 601 of the FIG. 6, where the MP module 113 may determine at least one first ray extending from the at least one first camera location to at least one pixel location of at least one of the at least one first pixel and the at least one second pixel. In one scenario, location information in metadata associated with a camera may be used to determine a first ray (e.g., line of sight) from the camera position to location of a first pixel of a first image and a second pixel of a second image or a model associated with the second image. For example, coordinates (e.g., X, Y, and Z location information) of the camera may be compared to the coordinates (e.g., X, Y, and Z location information) of a pixel in an image of a building to determine the first ray. In one scenario, a ray with reference to a pixel at a ground level near the camera location may be determined by using the location information of the camera and comparing it to location information at ground level. In one embodiment, the ray may be determined with reference to a pixel associated with an image of a POI captured by the first camera.

In step 603, the MP module 113 may determine at least one second ray extending from the at least one second camera location to the at least one pixel location. In one embodiment, location information associated with a second camera location (e.g., a virtual camera location) may be utilized to determine a second ray between the second camera and the pixel location associated with the image or a model rendered in an application. In one scenario, the second camera location may be determined from user interaction with a rendering of an image or POI in a 3D map application.

In step 605, the MP module 113 may determine at least one angle formed between the at least one first ray and the at least one second ray, wherein the confidence value is determined based, at least in part, on the at least one angle. In one embodiment, a first ray from a first camera extending to a pixel may be compared with a second ray from a second camera extending to the pixel to determine an angle between the first ray and the second ray. In one embodiment, a plurality of rays from the first camera may be compared with a plurality of rays from the second camera to determine a plurality of angles between the first rays and second rays.

In step 607, the MP module 113 may determine at least one transparency level for the rendering of the at least one pixel onto the at least one rendered three-dimensional map based, at least in part, on an accumulated confidence value. In one example, confidence values for pixels from various images of an object that are to be projected onto a pixel of a model of the object are accumulated in an accumulation buffer. In one embodiment, the at least one transparency level decreases with an increase in accumulated confidence value. In one embodiment, a confidence value lower than a confidence threshold value may indicate a transparent pixel.

The process 700 may begin at step 701 of the FIG. 7, where the MP module 113 may determine that the at least one image includes a plurality of overlapping images. In one scenario, one or more images of a POI may be utilized and overlapped onto another image or a model of the POI rendered in an application. For example, several images of a certain building may be used by a 3D map application for overlapping with a 3D model of that same building rendered in the map application.

In step 703, the MP module 113 may cause, at least in part, a sorting, a blending, or a combination thereof of the plurality of overlapping images based, at least in part, on the confidence value. In one scenario, a plurality of images of a POI may have been captured by a plurality of cameras where those images may be overlapped onto a model/image of the POI rendered in an application, for example, in a 3D map application. In one use case scenario, the camera location information associated with each image of the POI may be utilized for determining a sorting or blending of the overlapping images with the image of the POI rendered in the application. In one example, each pixel of each image may be blended according to the confidence value or the confidence threshold criterion associated with each pixel. The blending results may be improved by rendering the images sorted based on camera locations, so that the contributions from different images are added to the accumulation buffer in an order that is favorable for the blending function used.

In step 705, wherein the at least one image includes at least one video, the MP module 113 may determine at least one three-dimensional motion track for the at least one video, wherein the at least one confidence value, the rendering of the at least one pixel onto the at least one rendered three-dimensional map is based, at least in part, on the at least one three-dimensional motion track. In one scenario, a media content associated with a POI may be a video clip that is to be used in overlapping onto another media content (e.g., an image) or model of the POI in a rendering application. For example, a user may have a video of a certain city center, which he would like to view as rendered in a 3D map application. In one embodiment, a processor at a user device where the application is to be rendered, may process the video clip and/or its metadata for determining a three-dimensional motion track for the video clip. Further, a confidence value or the rendering of one or more pixels onto a rendered three-dimensional map may be based on the three-dimensional motion track. For example, as a user or an application at a user device may interact and move the rendering of the video clip in a virtual presentation in a 3D map application, the confidence value of rendering of pixels of the video clip may be updated based on the 3D motion track. For instance, the rendering may be blurry in one frame and clear in another frame.

FIG. 8 illustrates various cameras and associated rays between the cameras and an object in camera view, according to various embodiments.

Illustration 8a depicts a first camera 801 (e.g., an original user camera) which may be utilized by a user to capture an image or a video clip from a POI 803, e.g., a building, a 3D object, etc., wherein an incident ray 805 is extended between the first camera 801 and surface (e.g., a wall) of the POI 803 forming an angle of incidence 805a between the ray 805 and the surface of the POI 803. Additionally, a second incident ray 807 is extended from the first camera 801 to surface of ground level 809 that forms an angle of incidence 807a. In one embodiment, the angle information of 805a or 807a may be utilized in calculating a confidence value for a pixel in an image associated with each angle. In one scenario, the position of the first camera is substantially perpendicular to the POI 803, which can provide for more accurate details in a captured image or video of the POI 803 whereas if the first camera 801 was at an angular location with reference to the POI 803, the resulting image or video may have included some distortions in details of the POI 803. In one embodiment, media content that includes distortions may not be very useful in contributing image pixels for projecting/overlaying the image of POI 803 onto another image or model of the POI 803. In one embodiment, the processor at a UE 101 may calculate the angles 805a and 807a by using location information of the first camera 801 and location information of a pixel of the image of the POI 803 and the ground level 809 (e.g., in a depth buffer), wherein the angles can be calculated with reference to a pixel in the captured image of the POI 803 and the ground level 809. In one scenario, a normal vector of a surface of a pixel in a buffer may be utilized for calculating the angles or a normal vector may be reconstructed based on contents associated with a pixel in the depth buffer.

Referring to illustration 8b now, a second camera 811 (e.g., a virtual camera) is introduced for viewing the POI 803 from a slightly different perspective. In one scenario, a user interacting with a media rendering application (e.g., a 3D map application) may introduce the second camera 811. In one example, an incident ray 813 between the second camera 811 and the POI 803 forms an angle 813a between the incident really 805 and 813. Additionally, an incident ray 815 between the second camera 811 and the ground level 809 forms an angle 815a between the incident ray 807 and 815. In this illustration 8b, the first camera 801 and the second camera 811 are at different locations with reference to the POI 803 and the ground level 809 which result in the angle 813a between the rays 805 and 813, and angle 815a between the rays 807 and 815. In one embodiment, size of angle between a ray from an original camera and a ray from a virtual camera directed to a same pixel of an image may indicate a confidence in or a level of contribution by a pixel from an image that is to be projected onto another pixel. For example, the angle 815a is smaller than the angle 813a, which indicates that a pixel from the image of the surface of the ground 809 may provide for a better overlapping between the same pixels from the first camera 801 and the second camera 811.

Figure 9A:
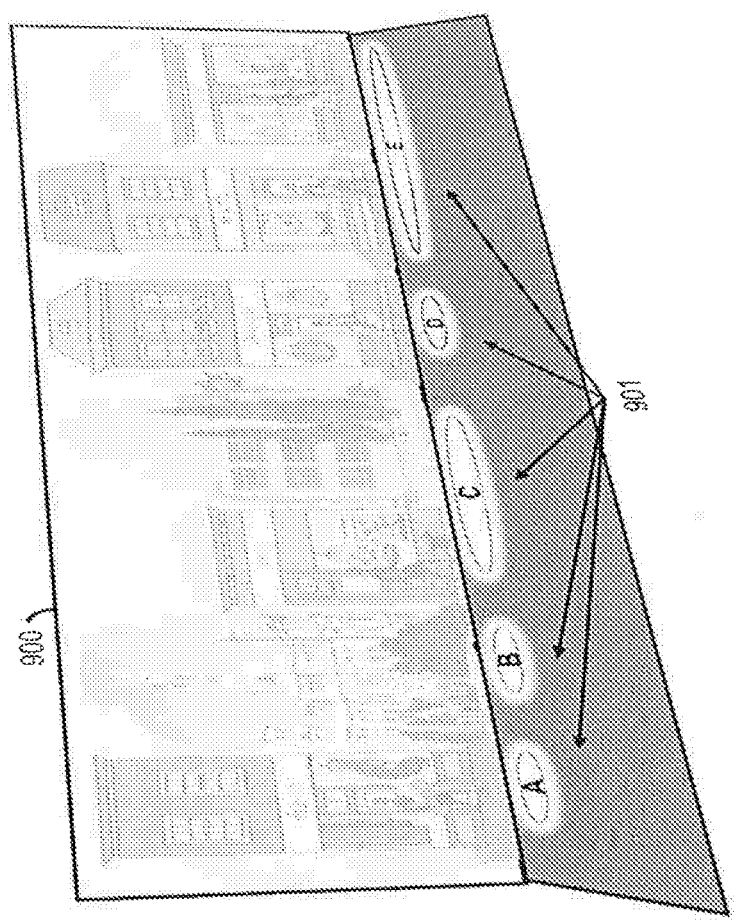
FIGS. 9A and 9B illustrate a rendering of objects in a media application, according to various embodiments.
Figure 9B:
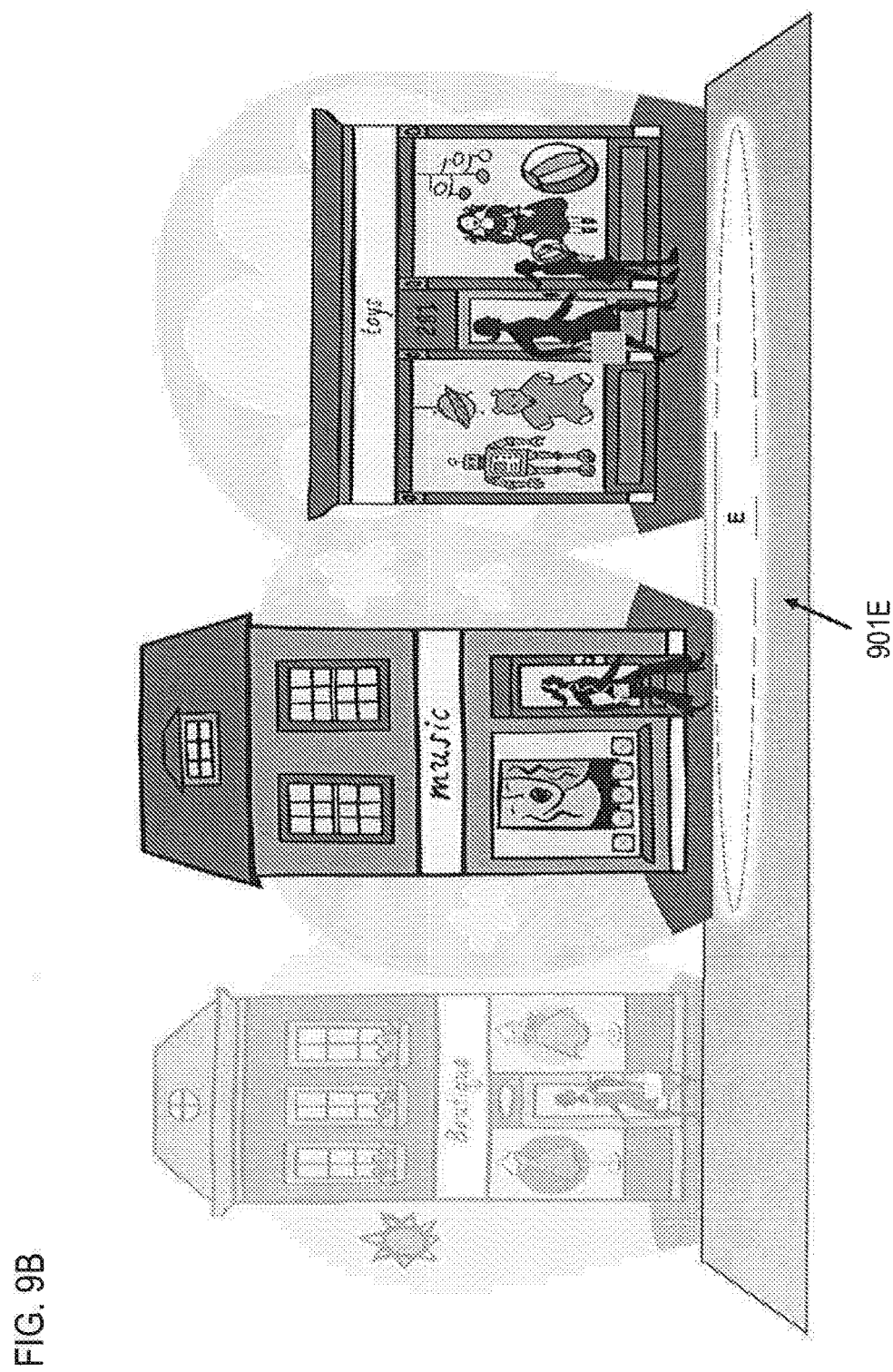

FIGS. 9A and 9B illustrate a rendering of objects in a media application, according to various embodiments.

FIG. 9A shows a general view of a street scene 900 including buildings, people, trees, etc. rendered in a media presentation application, for example, a 2D map, a 3D map, or the like. In one embodiment, a plurality of spotlights 901 near image clusters A, B, C, D, and E are presented. In one scenario, the objects rendered in the scene 900 may be based on projections of one or more images onto a model generated from various data sets associated with each object in the scene 900. For example, a plurality of pictures taken from the street scene 900 may be projected onto the model of the scene 900. In one embodiment, each spotlight 901 may provide a different perspective for viewing a certain cluster of images in the scene 900. Referring to FIG. 9B, in one example, moving closer to the cluster E expands the spotlight 901E for more detailed/clear view of the buildings and the objects in the cluster E. These spotlights are automatically formed by the parts of images that have high confidence values, i.e. can be projected onto the scene without distortion, and therefore expand when the perspective is moved to a more favorable viewpoint for an image of interest.

Figure 9C:
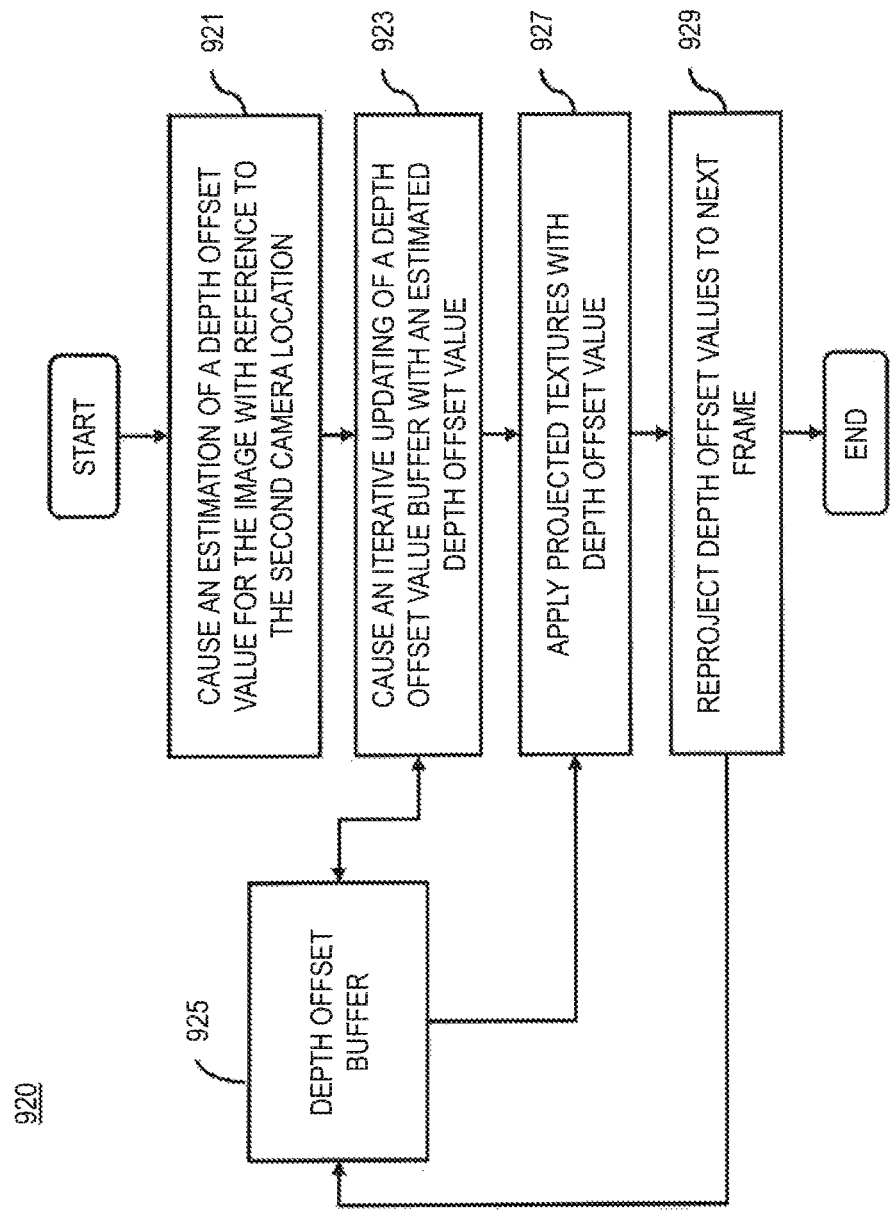
FIGS. 9C and 9D include process flowcharts for generating and analysis of depth offset values in rendering of objects, according to various embodiments.
Figure 9D:
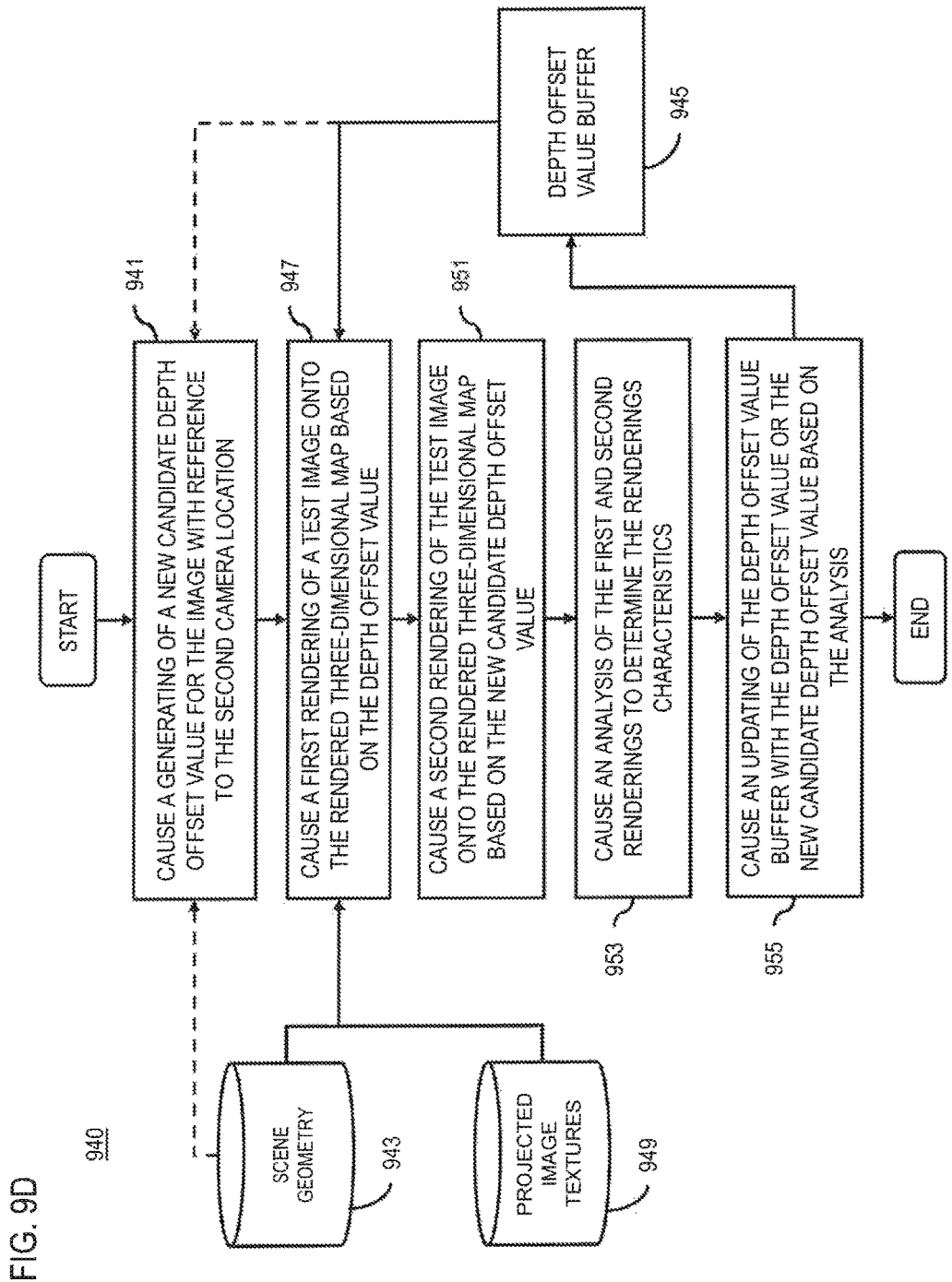

FIGS. 9C and 9D include process flowcharts for generating and analysis of depth offset values in rendering of objects, according to various embodiments.

Process 920 may begin at step 921 of FIG. 9C, where the MP module 113 may cause, at least in part, an estimation of at least one depth offset value for the at least one image with reference to the second camera location. In various embodiments, the MP module may utilize an algorithm to estimate a depth offset value based on a predetermined set of values, step values, or random values. For example, a predetermined set of values may include a depth offset of one meter, few inches, one foot, or the like, which may be a distance offset between the location of the first image and the first camera. In one instance, the depth offset value may be calculated towards or away from the position of a current (e.g., virtual) rendering camera.

In step 923, the MP module 113 may cause, at least in part, an iterative updating of a depth offset value buffer with at least one estimated depth offset value. In one embodiment, a depth offset value buffer, at 925, may be updated with one or more iterative depth offset value estimations. In one example, the depth offset value buffer may be a low-resolution, high-resolution, or the like buffer, which may store depth offset values associated with various block sizes (e.g., 8×8 pixel block) of an image.

In step 927, the rendering of the at least one image onto the at least one rendered three-dimensional map is based, at least in part, on the at least one depth offset value. In step 929, the rendering of the at least one image onto the at least one rendered three-dimensional map is based, at least in part, on the at least one user interaction and the at least one depth offset value. In one embodiment, a subsequent rendering of one or more images or one or more portions of the one or more images may be a rendering of a next frame onto a screen location that is based on the one or more depth offset values from the previous rendering (e.g., depth offset value) and one or more new camera locations, e.g., the first camera, the second camera, or the like.

Process 940 may begin at step 941 of FIG. 9D, where the MP module 113 may cause, at least in part, a generating of at least one new candidate depth offset value for the at least one image with reference to the second camera location. In various embodiments, the MP module may utilize an algorithm to estimate one or more new depth offset values, which may be based on previous values stored at the depth offset value buffer, size of the depth offset value buffer, a current rendering frame of an image, neighboring/adjacent depth values, a predetermined set of values, step values, or random offsets. In one instance, scene geometry data from storage 943 and depth offset values from buffer 945 may be utilized in generating the new candidate depth offset values.

In step 947, the MP module 113 may cause, at least in part, a first rendering of at least one test image onto the at least one rendered three-dimensional map based, at least in part, on the at least one depth offset value, which may include scene geometry data from 943, projected image texture data from 949, and depth offset values from the buffer 945. In step 951, the MP module 113 may cause, at least in part, a second rendering of the at least one test image onto the at least one rendered three-dimensional map based, at least in part, on the at least one new candidate depth offset value. In one instance, the same image or portion of the image may be rendered by utilizing the new candidate values.

In step 953, the MP module 113 may cause, at least in part, an analysis of the first rendering and the second rendering to determine one or more rendering characteristics associated with the first rendering and the second rendering. In one embodiment, results of the analysis may be utilized to determine a quality, coherence or matching of the renderings of the images based on the previous depth offset values and the new candidate depth offset values. For example, a rendering of an image with an offset of one meter may be compared to a rendering of the image with an offset of three meters. In one embodiment, the renderings and the analysis may be of a portion of an image (e.g., a block of pixels). In step 955, the MP module 113 may cause, at least in part, an updating of the depth offset value buffer 945 with the at least one depth offset value or the at least one new candidate depth offset value based, at least in part, on the analysis. In one example, the new candidate values selected for updating may be based on a number of iterations and the analysis results.

Figure 9F:
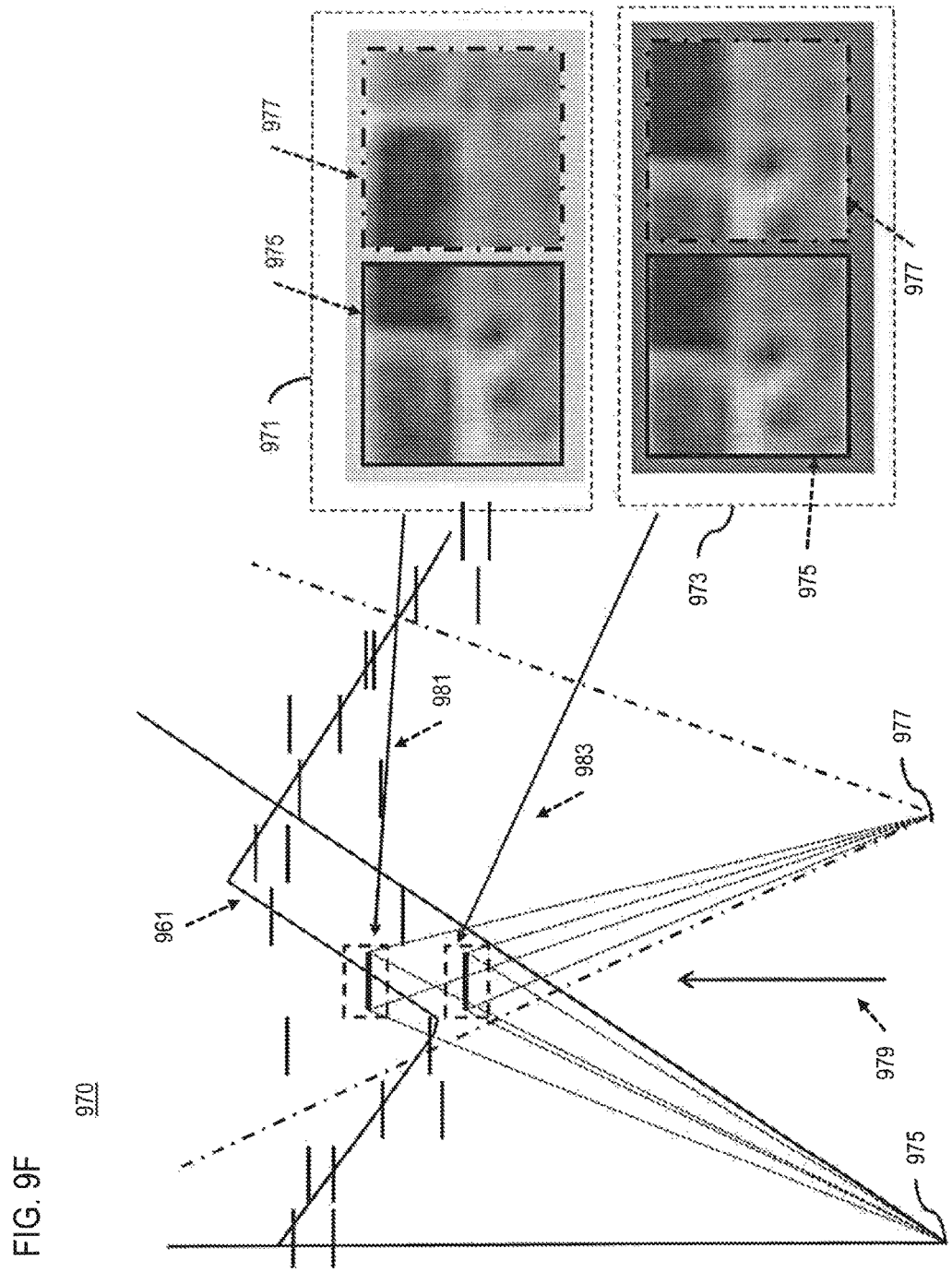
Figure 9G:
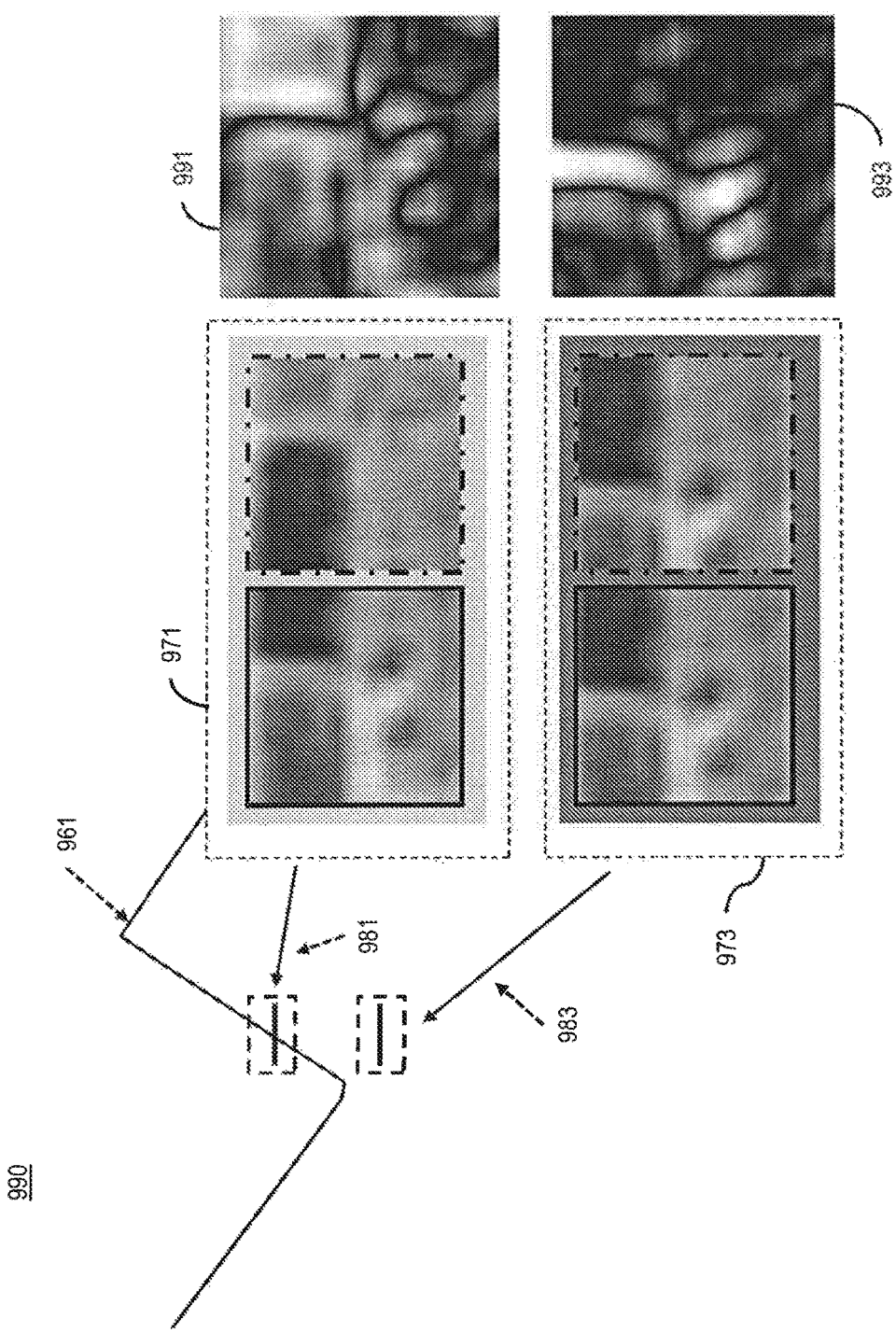

FIGS. 9E through 9G illustrate graphical representation of the analysis of depth offset values in rendering of objects. FIG. 9E illustrates diagram 960 that includes curvilinear line 961 representing depth values of actual geometry of a 3D image that are modified by the depth offset values from the last frame, based on a viewing direction 963, and a plurality of new candidate values 965. In one example, resolution of the new candidate values 965 is less than that of actual geometry 961, wherein the new candidate values may be based on the previous depth values that are extrapolated, randomized, jittered, binary search, or the like.

FIG. 9F illustrates diagram 970 that includes projected image patches 971 based on current depth offset values and 973 based on new candidate depth offset values. In one scenario, each image patch may include geo-located images "A", 975, and image "B", 977, that are projected from a viewing direction 979. In one embodiment, a plurality data points based on the current image offset values, e.g., 981, and data points based on the candidate offset values, e.g., 983, may be analyzed and compared to determine one or more characteristics associated with the projections of the images, wherein the analysis may be performed for each pair of images in the respective image sets 971 and 973.

FIG. 9G illustrates diagram 990 where, in one example, a GPU may be utilized to calculate root-mean-square error and store the resulting error value in order to compare each pixel in the images of 971 and 973 in order to select a current or a candidate offset value. In one instance, images 991 and 993 represent patch differences that may be compared for selecting from a current or a candidate offset value. In one example, the patch image 993 that is based on candidate offset values may be selected, e.g., based on pixel error value, and the depth offset value buffer may be updated with the candidate offset values.

Figure 10:
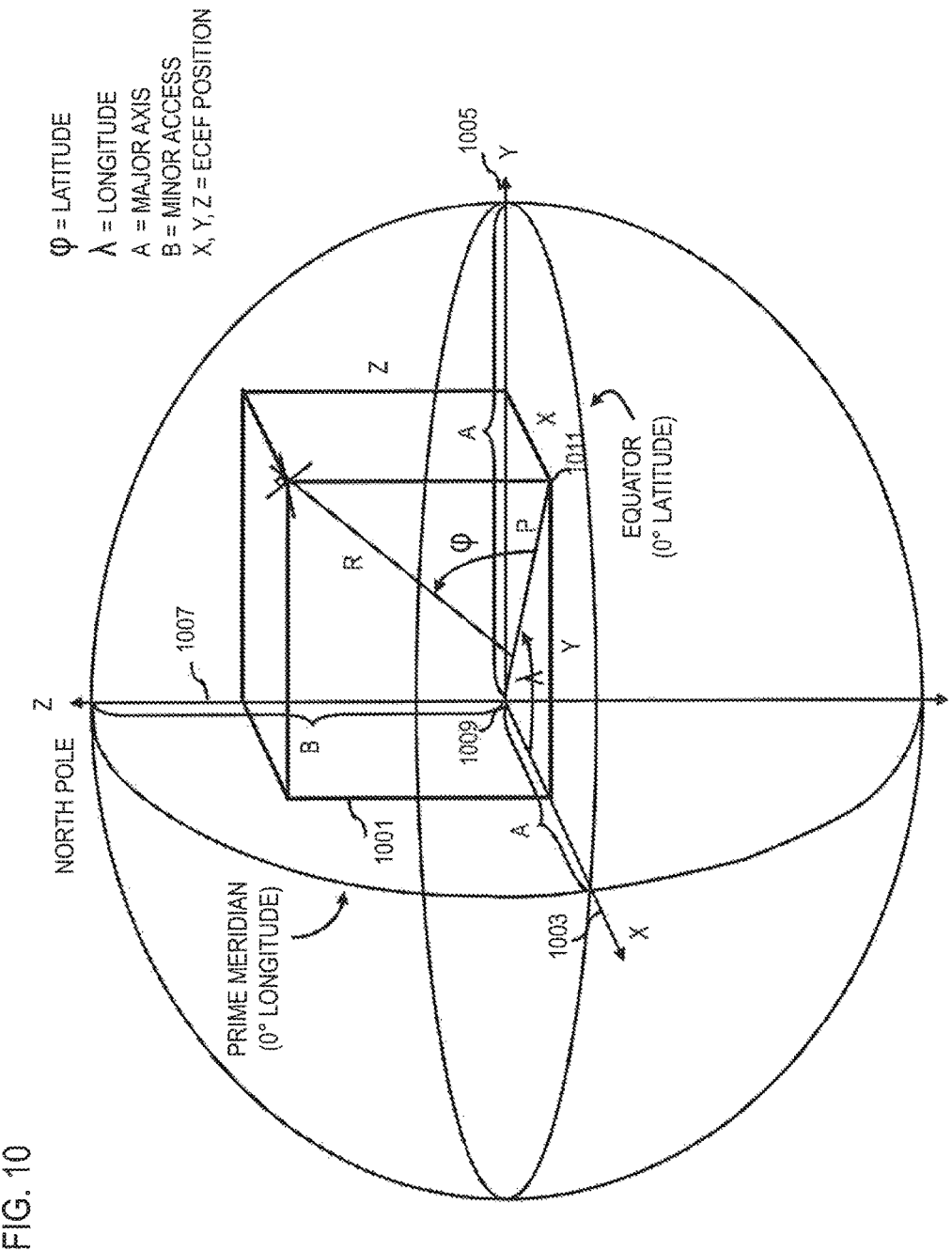
FIG. 10 is a diagram of an earth centered, earth fixed (ECEF) Cartesian coordinate system utilized in the process of FIGS. 4-7, according to one embodiment.

FIG. 10 is a diagram of an earth centered, earth fixed (ECEF) Cartesian coordinate system utilized in the process of FIGS. 4-7, according to one embodiment. A general Cartesian coordinate system for a three dimensional space (1001) is uniquely defined by its origin point and three perpendicular axis lines (X (1003), Y (1005), Z (1007)) meeting at the origin O (10010). A 3D point P (1011) is then specified by a triple of numerical coordinates (Xp, Yp, Zp), which are the signed distances from the point P to the three planes defined by two axes (Y-Z, X-Z, X-Y) respectively. In one scenario, the ECEF Cartesian coordinate system has its origin point (0,0,0) defined as the center of the mass of the earth, its X-axis intersects the sphere of the earth at 0° latitude (equator) and O° longitude and its Z-axis points towards the north pole, wherein a one to one mapping exists between ECEF and the geo-graphic co-ordination systems.

Figure 11:
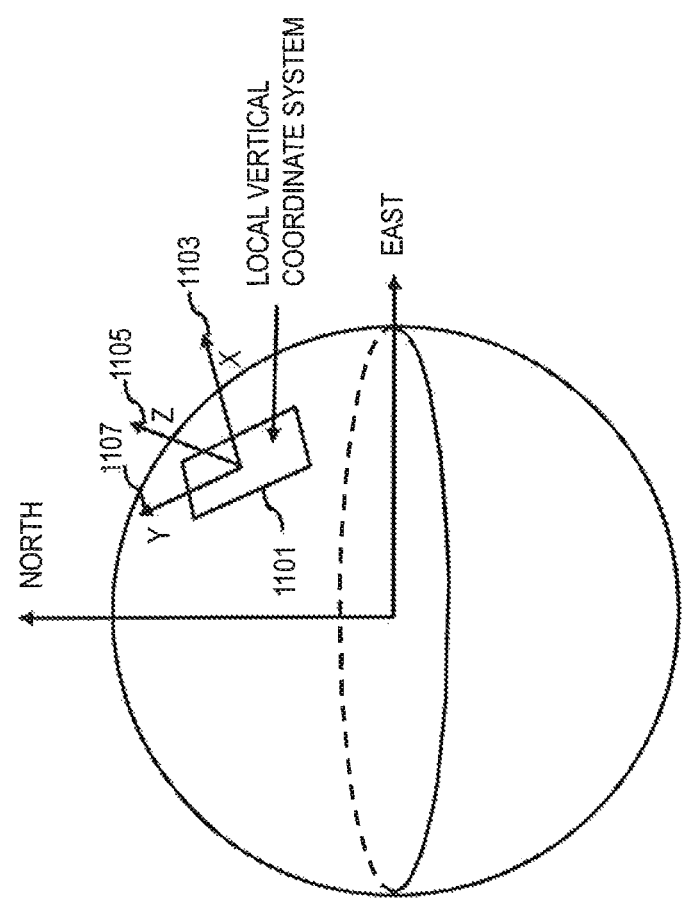
FIG. 11 illustrates a Cartesian coordinate system (CCS) 3D local system with its origin point restricted on earth and three axes (X-Y-Z) utilized in the process of FIGS. 4-7, according to one embodiment.

FIG. 11 illustrates a Cartesian coordinate system (CCS) 3D local system (1101) with its origin point restricted on earth and three axes (X (1103)-Y (1107)-Z (1105)) utilized in the process of FIGS. 4-7, according to one embodiment. A CCS_3D_local system is a Cartesian coordinate system that has its origin point restricted on earth surface. FIG. 11 is a representation of a 3D earth modeling, wherein a CCS_3D_local system is often used to represent a set of 3D geo-augmented data that are near to a reference point on earth, for instance, the 3D geo-augmented data may cover a limited space of 11 km, thereby making the co-ordinate system local. In one scenario, given the origin point and three axes of a CCS_3D_local system, there exists a unique transformation between the CCS_3D_ECEF and the local system in question. If the origin and three axes are unknown, it is difficult to map points in CCS_3D_local to CCS_3D_ECEF system. In one embodiment, a graphics processor at a UE 101 may process an image associated with a local coordinates system and transform the 3D geometry into a camera space in 3D graphics rendering pipelines, which is a coordinates system fixed to a virtual camera. Similarly, the depth buffer stores its information in the same coordinates, which is also used for calculating the pixel angle and confidence value calculation.

Figure 12:
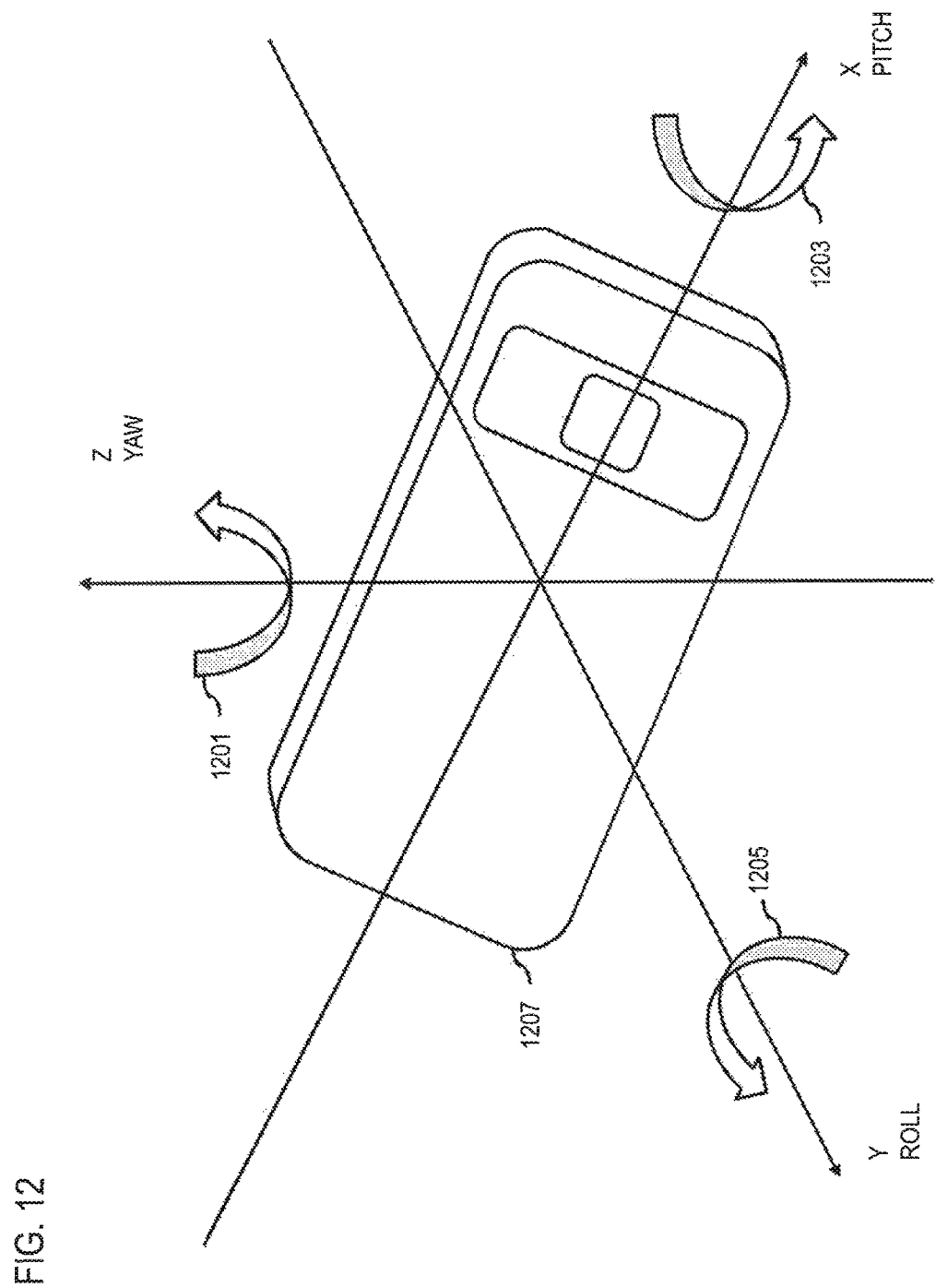
FIG. 12 is a diagram of a camera orientation in a 3D space utilized in the process of FIGS. 4-7, according to one embodiment.

FIG. 12 is a diagram of a camera orientation in a 3D space utilized in the process of FIGS. 4-7, according to one embodiment. Here, Yaw (1201) is a counterclockwise rotation along the z axis, Pitch (1203) is a counterclockwise rotation along the y axis, and roll (1205) is a counterclockwise rotation along the x axis. In one scenario, the video frames are often regarded as a sequence of still images that are captured (or displayed) at different time at varying camera locations. In one scenario, the camera pose of associated videos frames represent 3D locations and orientations of the video-capturing-camera at the time when the video frames were recorded. The camera locations can be simply described as XL, YL, ZL. The orientation can be described as roll, yaw and pitch angles of rotating the camera from a reference placement to its current placement. Further, the orientation can be represented by rotation matrices or quaternions, which are mathematically equivalent to Euler angles. With the camera location and orientation, one can define the camera movement with six degrees of freedom (6 DoF) in a coordinate system.

Figure 13:
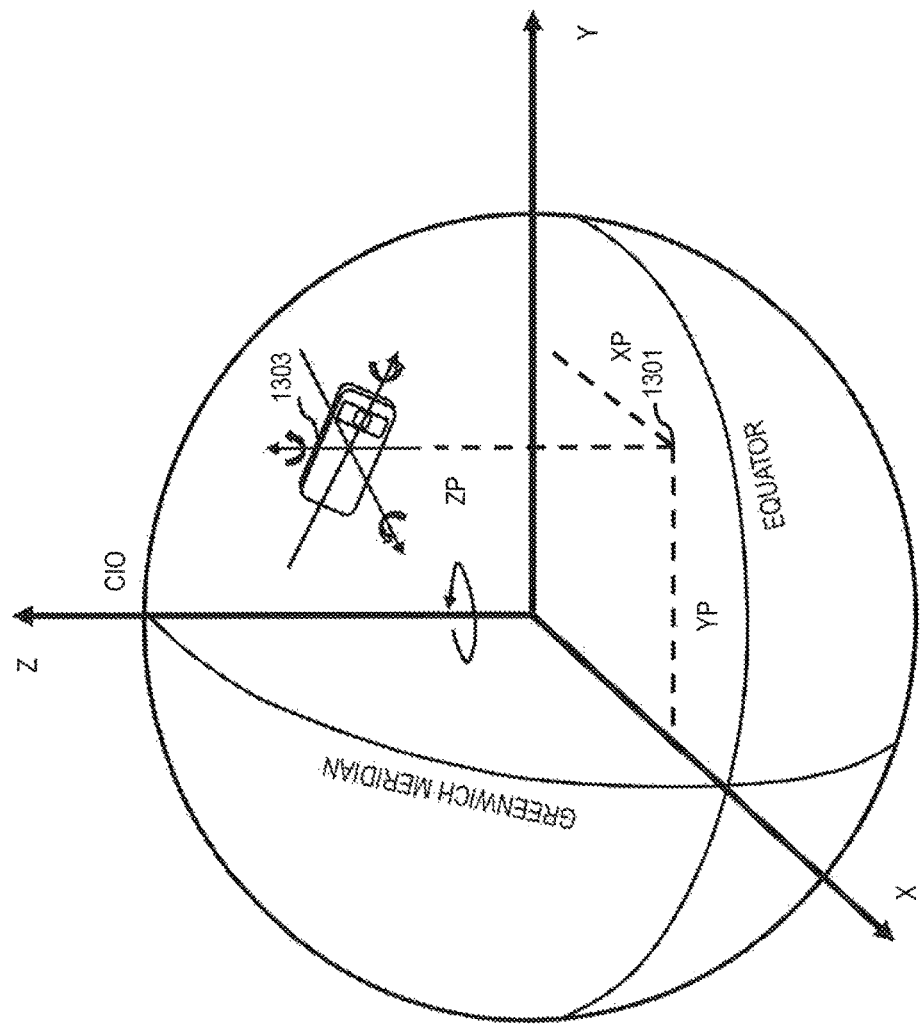
FIG. 13 is a diagram of a camera pose in CCS_3D_ECEF utilized in the process of FIGS. 4-7, according to one embodiment.

FIG. 13 illustrates an example of a camera pose in CCS_3D_ECEF utilized in the process of FIGS. 4-7, according to one embodiment. In one scenario, a point cloud is a set of 3D points that are viewable from one or more multiple video frames, when viewed from a given camera pose (1301), 3D points are projected, according to proper camera models, onto the 2D image and gives rise to color intensities at different pixel locations (1303). In the context of Earth modeling, 3D point clouds can be directly measured by LIDAR technology. Alternatively, 3D point clouds can be reconstructed from input video frames by using computer vision Structure-From-Motion (SFM) technology. Within CCS_3D_ECEF, 3D point clouds as well as camera poses needs to be accurately defined:

1) When a CCS_3D_ECEF is used, the camera poses and the point clouds are globally defined.

2) If a CCS_3D_Local system with known origin and axes is used, the camera poses and point clouds can be uniquely mapped to the CCS_3D_ECEF. By doing this, the camera pose is also defined in a global coordinate system. Besides, if a CCS 3D Local system with unknown origin and axes is used, camera poses and point clouds can only be defined within the local coordinate system, because of the difficulty to map point-clouds and camera poses into CCS_3D_ECEF.

The processes described herein for accurate processing and registering of media content for rendering in 3D maps and other applications may be advantageously implemented via software, hardware, firmware, or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 14:
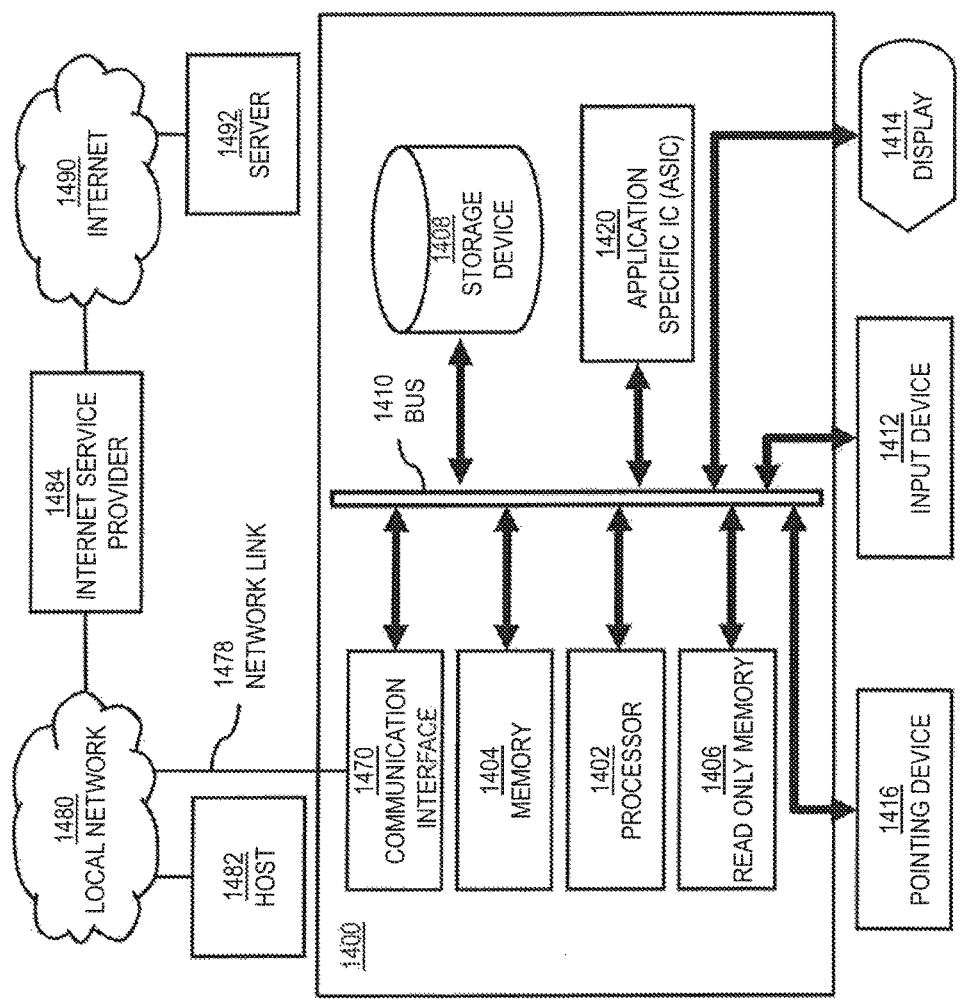
FIG. 14 is a diagram of hardware that can be used to implement an embodiment of the invention.

FIG. 14 illustrates a computer system 1400 upon which an embodiment of the invention may be implemented. Although computer system 1400 is depicted with respect to a particular device or equipment, it is contemplated that other devices or equipment (e.g., network elements, servers, etc.) within FIG. 14 can deploy the illustrated hardware and components of system 1400. Computer system 1400 is programmed (e.g., via computer program code or instructions) to accurately process and register media content for rendering in 3D maps and other applications as described herein and includes a communication mechanism such as a bus 1410 for passing information between other internal and external components of the computer system 1400. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1400, or a portion thereof, constitutes a means for performing one or more steps of accurate processing and registering of media content for rendering in 3D maps and other applications.

A bus 1410 includes one or more parallel conductors of information so that information is transferred quickly among devices coupled to the bus 1410. One or more processors 1402 for processing information are coupled with the bus 1410.

A processor (or multiple processors) 1402 performs a set of operations on information as specified by computer program code related to accurate processing and registering of media content for rendering in 3D maps and other applications. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1410 and placing information on the bus 1410. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1402, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1400 also includes a memory 1404 coupled to bus 1410. The memory 1404, such as a random access memory (RAM) or any other dynamic storage device, stores information including processor instructions for accurate processing and registering of media content for rendering in 3D maps and other applications. Dynamic memory allows information stored therein to be changed by the computer system 1400. RAM allows a unit of information stored at a location called a memory address to be stored and retrieved independently of information at neighboring addresses. The memory 1404 is also used by the processor 1402 to store temporary values during execution of processor instructions. The computer system 1400 also includes a read only memory (ROM) 1406 or any other static storage device coupled to the bus 1410 for storing static information, including instructions, that is not changed by the computer system 1400. Some memory is composed of volatile storage that loses the information stored thereon when power is lost. Also coupled to bus 1410 is a non-volatile (persistent) storage device 1408, such as a magnetic disk, optical disk or flash card, for storing information, including instructions, that persists even when the computer system 1400 is turned off or otherwise loses power.

Information, including instructions for accurate processing and registering of media content for rendering in 3D maps and other applications, is provided to the bus 1410 for use by the processor from an external input device 1412, such as a keyboard containing alphanumeric keys operated by a human user, or a sensor. A sensor detects conditions in its vicinity and transforms those detections into physical expression compatible with the measurable phenomenon used to represent information in computer system 1400. Other external devices coupled to bus 1410, used primarily for interacting with humans, include a display device 1414, such as a cathode ray tube (CRT), a liquid crystal display (LCD), a light emitting diode (LED) display, an organic LED (OLED) display, a plasma screen, or a printer for presenting text or images, and a pointing device 1416, such as a mouse, a trackball, cursor direction keys, or a motion sensor, for controlling a position of a small cursor image presented on the display 1414 and issuing commands associated with graphical elements presented on the display 1414. In some embodiments, for example, in embodiments in which the computer system 1400 performs all functions automatically without human input, one or more of external input device 1412, display device 1414, and pointing device 1416 is omitted.

In the illustrated embodiment, special purpose hardware, such as an application specific integrated circuit (ASIC) 1420, is coupled to bus 1410. The special purpose hardware is configured to perform operations not performed by processor 1402 quickly enough for special purposes. Examples of ASICs include graphics accelerator cards for generating images for display 1414, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1400 also includes one or more instances of a communications interface 1470 coupled to bus 1410. Communication interface 1470 provides a one-way or two-way communication coupling to a variety of external devices that operate with their own processors, such as printers, scanners, and external disks. In general the coupling is with a network link 1478 that is connected to a local network 1480 to which a variety of external devices with their own processors are connected. For example, communication interface 1470 may be a parallel port or a serial port or a universal serial bus (USB) port on a personal computer. In some embodiments, communications interface 1470 is an integrated services digital network (ISDN) card or a digital subscriber line (DSL) card or a telephone modem that provides an information communication connection to a corresponding type of telephone line. In some embodiments, a communication interface 1470 is a cable modem that converts signals on bus 1410 into signals for a communication connection over a coaxial cable or into optical signals for a communication connection over a fiber optic cable. As another example, communications interface 1470 may be a local area network (LAN) card to provide a data communication connection to a compatible LAN, such as Ethernet. Wireless links may also be implemented. For wireless links, the communications interface 1470 sends or receives or both sends and receives electrical, acoustic, or electromagnetic signals, including infrared and optical signals that carry information streams, such as digital data. For example, in wireless handheld devices, such as mobile telephones like cell phones, the communications interface 1470 includes a radio band electromagnetic transmitter and receiver called a radio transceiver. In certain embodiments, the communications interface 1470 enables connection to the communication network 111 for accurate processing and registering of media content for rendering in 3D maps and other applications.

The term "computer-readable medium" as used herein refers to any medium that participates in providing information to processor 1402, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1408. Volatile media include, for example, dynamic memory 1404. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization, or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1420.

Network link 1478 typically provides information communication using transmission media through one or more networks to other devices that use or process the information. For example, network link 1478 may provide a connection through local network 1480 to a host computer 1482 or to equipment 1484 operated by an Internet Service Provider (ISP). ISP equipment 1484 in turn provides data communication services through the public, world-wide packet-switching communication network of networks now commonly referred to as the Internet 1490.

A computer called a server host 1492 connected to the Internet hosts a process that provides a service in response to information received over the Internet. For example, server host 1492 hosts a process that provides information representing video data for presentation at display 1414. It is contemplated that the components of system 1400 can be deployed in various configurations within other computer systems, e.g., host 1482 and server 1492.

At least some embodiments of the invention are related to the use of computer system 1400 for implementing some or all of the techniques described herein. According to one embodiment of the invention, those techniques are performed by computer system 1400 in response to processor 1402 executing one or more sequences of one or more processor instructions contained in memory 1404. Such instructions, also called computer instructions, software and program code, may be read into memory 1404 from another computer-readable medium such as storage device 1408 or network link 1478. Execution of the sequences of instructions contained in memory 1404 causes processor 1402 to perform one or more of the method steps described herein. In alternative embodiments, hardware, such as ASIC 1420, may be used in place of or in combination with software to implement the invention. Thus, embodiments of the invention are not limited to any specific combination of hardware and software, unless otherwise explicitly stated herein.

The signals transmitted over network link 1478 and other networks through communications interface 1470, carry information to and from computer system 1400. Computer system 1400 can send and receive information, including program code, through the networks 1480, 1490 among others, through network link 1478 and communications interface 1470. In an example using the Internet 1490, a server host 1492 transmits program code for a particular application, requested by a message sent from computer 1400, through Internet 1490, ISP equipment 1484, local network 1480, and communications interface 1470. The received code may be executed by processor 1402 as it is received, or may be stored in memory 1404 or in storage device 1408 or any other non-volatile storage for later execution, or both. In this manner, computer system 1400 may obtain application program code in the form of signals on a carrier wave.

Various forms of computer readable media may be involved in carrying one or more sequence of instructions or data or both to processor 1402 for execution. For example, instructions and data may initially be carried on a magnetic disk of a remote computer such as host 1482. The remote computer loads the instructions and data into its dynamic memory and sends the instructions and data over a telephone line using a modem. A modem local to the computer system 1400 receives the instructions and data on a telephone line and uses an infra-red transmitter to convert the instructions and data to a signal on an infra-red carrier wave serving as the network link 1478. An infrared detector serving as communications interface 1470 receives the instructions and data carried in the infrared signal and places information representing the instructions and data onto bus 1410. Bus 1410 carries the information to memory 1404 from which processor 1402 retrieves and executes the instructions using some of the data sent with the instructions. The instructions and data received in memory 1404 may optionally be stored on storage device 1408, either before or after execution by the processor 1402.

FIG. 15 illustrates a chip set or chip 1500 upon which an embodiment of the invention may be implemented. Chip set 1500 is programmed for accurate processing and registering of media content for rendering in 3D maps and other applications as described herein and includes, for instance, the processor and memory components described with respect to FIG. 14 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1500 can be implemented in a single chip. It is further contemplated that in certain embodiments the chip set or chip 1500 can be implemented as a single "system on a chip." It is further contemplated that in certain embodiments a separate ASIC would not be used, for example, and that all relevant functions as disclosed herein would be performed by a processor or processors. Chip set or chip 1500, or a portion thereof, constitutes a means for performing one or more steps of providing user interface navigation information associated with the availability of functions. Chip set or chip 1500, or a portion thereof, constitutes a means for performing one or more steps of accurate processing and registering of media content for rendering in 3D maps and other applications.

In one embodiment, the chip set or chip 1500 includes a communication mechanism such as a bus 1501 for passing information among the components of the chip set 1500. A processor 1503 has connectivity to the bus 1501 to execute instructions and process information stored in, for example, a memory 1505. The processor 1503 may include one or more processing cores with each core configured to perform independently. A multi-core processor enables multiprocessing within a single physical package. Examples of a multi-core processor include two, four, eight, or greater numbers of processing cores. Alternatively or in addition, the processor 1503 may include one or more microprocessors configured in tandem via the bus 1501 to enable independent execution of instructions, pipelining, and multithreading. The processor 1503 may also be accompanied with one or more specialized components to perform certain processing functions and tasks such as one or more digital signal processors (DSP) 1507, or one or more application-specific integrated circuits (ASIC) 1509. A DSP 1507 typically is configured to process real-world signals (e.g., sound) in real time independently of the processor 1503. Similarly, an ASIC 1509 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1500 includes merely one or more processors and some software and/or firmware supporting and/or relating to and/or for the one or more processors.

The processor 1503 and accompanying components have connectivity to the memory 1505 via the bus 1501. The memory 1505 includes both dynamic memory (e.g., RAM, magnetic disk, writable optical disk, etc.) and static memory (e.g., ROM, CD-ROM, etc.) for storing executable instructions that when executed perform the inventive steps described herein to accurately process and register media content for rendering in 3D maps and other applications. The memory 1505 also stores the data associated with or generated by the execution of the inventive steps.

Figure 16:
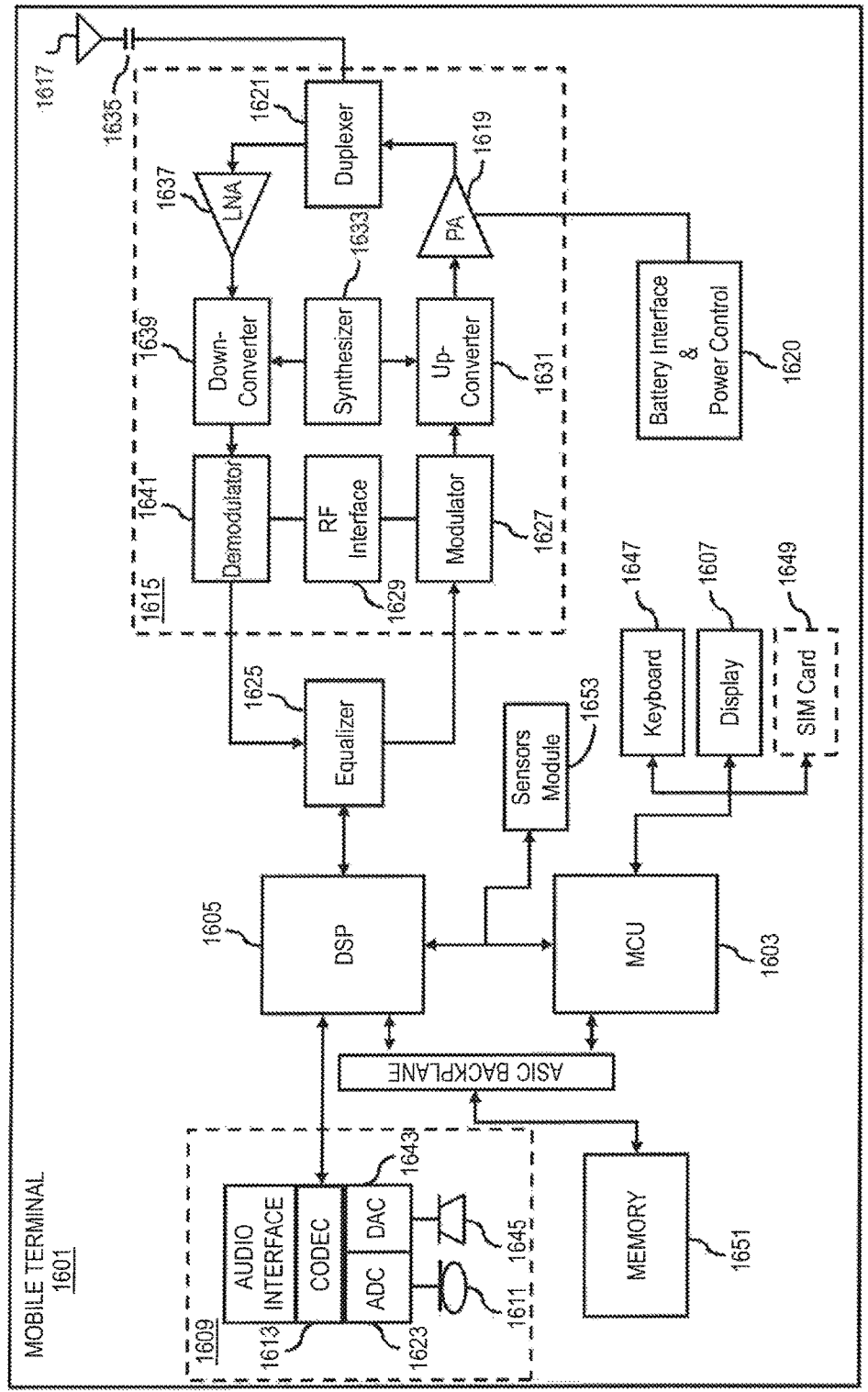
FIG. 16 is a diagram of a mobile terminal (e.g., handset) that can be used to implement an embodiment of the invention.

FIG. 16 is a diagram of exemplary components of a mobile terminal (e.g., handset) for communications, which is capable of operating in the system of FIG. 1, according to one embodiment. In some embodiments, mobile terminal 1601, or a portion thereof, constitutes a means for performing one or more steps of accurate processing and registering of media content for rendering in 3D maps and other applications. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1603, a Digital Signal Processor (DSP) 1605, and a receiver/transmitter unit including a microphone gain control unit and a speaker gain control unit. A main display unit 1607 provides a display to the user in support of various applications and mobile terminal functions that perform or support the steps of accurate processing and registering of media content for rendering in 3D maps and other applications. The display 1607 includes display circuitry configured to display at least a portion of a user interface of the mobile terminal (e.g., mobile telephone). Additionally, the display 1607 and display circuitry are configured to facilitate user control of at least some functions of the mobile terminal. An audio function circuitry 1609 includes a microphone 1611 and microphone amplifier that amplifies the speech signal output from the microphone 1611. The amplified speech signal output from the microphone 1611 is fed to a coder/decoder (CODEC) 1613.

A radio section 1615 amplifies power and converts frequency in order to communicate with a base station, which is included in a mobile communication system, via antenna 1617. The power amplifier (PA) 1619 and the transmitter/modulation circuitry are operationally responsive to the MCU 1603, with an output from the PA 1619 coupled to the duplexer 1621 or circulator or antenna switch, as known in the art. The PA 1619 also couples to a battery interface and power control unit 1620.

In use, a user of mobile terminal 1601 speaks into the microphone 1611 and his or her voice along with any detected background noise is converted into an analog voltage. The analog voltage is then converted into a digital signal through the Analog to Digital Converter (ADC) 1623. The control unit 1603 routes the digital signal into the DSP 1605 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1625 for compensation of any frequency-dependent impairments that occur during transmission though the air such as phase and amplitude distortion. After equalizing the bit stream, the modulator 1627 combines the signal with a RF signal generated in the RF interface 1629. The modulator 1627 generates a sine wave by way of frequency or phase modulation. In order to prepare the signal for transmission, an up-converter 1631 combines the sine wave output from the modulator 1627 with another sine wave generated by a synthesizer 1633 to achieve the desired frequency of transmission. The signal is then sent through a PA 1619 to increase the signal to an appropriate power level. In practical systems, the PA 1619 acts as a variable gain amplifier whose gain is controlled by the DSP 1605 from information received from a network base station. The signal is then filtered within the duplexer 1621 and optionally sent to an antenna coupler 1635 to match impedances to provide maximum power transfer. Finally, the signal is transmitted via antenna 1617 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1601 are received via antenna 1617 and immediately amplified by a low noise amplifier (LNA) 1637. A down-converter 1639 lowers the carrier frequency while the demodulator 1641 strips away the RF leaving only a digital bit stream. The signal then goes through the equalizer 1625 and is processed by the DSP 1605. A Digital to Analog Converter (DAC) 1643 converts the signal and the resulting output is transmitted to the user through the speaker 1645, all under control of a Main Control Unit (MCU) 1603 which can be implemented as a Central Processing Unit (CPU).

The MCU 1603 receives various signals including input signals from the keyboard 1647. The keyboard 1647 and/or the MCU 1603 in combination with other user input components (e.g., the microphone 1611) comprise a user interface circuitry for managing user input. The MCU 1603 runs a user interface software to facilitate user control of at least some functions of the mobile terminal 1601 for accurate processing and registering of media content for rendering in 3D maps and other applications. The MCU 1603 also delivers a display command and a switch command to the display 1607 and to the speech output switching controller, respectively. Further, the MCU 1603 exchanges information with the DSP 1605 and can access an optionally incorporated SIM card 1649 and a memory 1651. In addition, the MCU 1603 executes various control functions required of the terminal. The DSP 1605 may, depending upon the implementation, perform any of a variety of conventional digital processing functions on the voice signals. Additionally, DSP 1605 determines the background noise level of the local environment from the signals detected by microphone 1611 and sets the gain of microphone 1611 to a level selected to compensate for the natural tendency of the user of the mobile terminal 1601.

The CODEC 1613 includes the ADC 1623 and DAC 1643. The memory 1651 stores various data including call incoming tone data and is capable of storing other data including music data received via, e.g., the global Internet. The software module could reside in RAM memory, flash memory, registers, or any other form of writable storage medium known in the art. The memory device 1651 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1649 carries, for instance, important information, such as the cellular phone number, the carrier supplying service, subscription details, and security information. The SIM card 1649 serves primarily to identify the mobile terminal 1601 on a radio network. The card 1649 also contains a memory for storing a personal telephone number registry, text messages, and user specific mobile terminal settings.

Additionally, sensors module 1653 may include various sensors, for instance, a location sensor, a speed sensor, an audio sensor, an image sensor, a brightness sensor, a biometrics sensor, various physiological sensors, a directional sensor, and the like, for capturing various data associated with the mobile terminal 1601 (e.g., a mobile phone), a user of the mobile terminal 1601, an environment of the mobile terminal 1601 and/or the user, or a combination thereof, wherein the data may be collected, processed, stored, and/or shared with one or more components and/or modules of the mobile terminal 1601 and/or with one or more entities external to the mobile terminal 1601.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:
1. An apparatus comprising:
at least one processor; and
at least one memory including computer program code for one or more programs, the at least one memory and the computer program code configured to, with the at least one processor, cause the apparatus to perform at least the following,
determine each of a plurality of first pixels of an image that geometrically corresponds to a second pixel of a rendered three-dimensional map, wherein the three-dimensional map is a three-dimensional geographic map;
process the each first pixel and the second pixel to determine a confidence value that increases as a transparency level for the rendering of the each first pixel onto the three-dimensional map decreases, wherein the confidence value indicates an estimated level of geometric distortion of the each first pixel as projected onto the three-dimensional map resulting from a difference between an image capturing perspective of the image with respect to the each first pixel and a virtual viewing perspective of the three-dimensional map;
initiate a rendering of the first pixels onto the three-dimensional map from the virtual viewing perspective based on the confidence value;

determine at least one user interaction with the three-dimensional map; and
initiate an updating of the confidence value, the rendering of the first pixels onto the three-dimensional map, or a combination thereof in real time or substantially in real time based on the at least one user interaction,
wherein the confidence value of a respective first pixel decreases as the virtual viewing perspective moves further away from the image capturing perspective.

2. An apparatus of claim 1, wherein the at least one user interaction results in a change in (a) the virtual viewing perspective for the three-dimensional map, (b) at least one rendering characteristic for at least one of the first pixels, the image, the second pixel, and the three-dimensional map; or (c) a combination thereof; and wherein the at least one rendering characteristic includes a fade parameter, a toggle parameter, a size parameter, or a combination thereof.

3. An apparatus of claim 1, wherein the apparatus is further caused to:
initiate a comparison of the confidence value against at least one threshold confidence criterion to determine whether to initiate the rendering of the first pixels onto the three-dimensional map.

4. An apparatus of claim 1, wherein the apparatus is further caused to:
process metadata associated with the each first pixel and the second pixel;
determine a first camera location associated with the image and a second camera location associated with the three-dimensional map based on the metadata; and
determine an offset between the first camera location and the second camera location,
wherein the confidence value is further based on the offset.

5. An apparatus of claim 4, wherein the apparatus is further caused to:
determine at least one first ray extending from the first camera location to at least one pixel location of one of the first pixels and the second pixel;
determine at least one second ray extending from the second camera location to the at least one pixel location; and
determine at least one angle formed between the at least one first ray and the at least one second ray,
wherein the confidence value is determined based on the at least one angle.

6. An apparatus of claim 5, wherein the apparatus is further caused to:
determine the transparency level for the rendering of the each first pixel onto the three-dimensional map based on an accumulated confidence value added from a plurality of confidence values determined per pixel for a plurality of images including the image.

7. An apparatus of claim 6, wherein the transparency level decreases with an increase in the number of the images.

8. An apparatus of claim 4, wherein the apparatus is further caused to:
initiate an estimation of at least one depth offset value for the image with reference to the second camera location; and
initiate an iterative updating of a depth offset value buffer with at least one estimated depth offset value.

9. An apparatus of claim 8, wherein the rendering of the first pixels onto the three-dimensional map is based on the at least one depth offset value.

10. An apparatus of claim 8, wherein the rendering of the first pixels onto the three-dimensional map is based on at least one user interaction and the at least one depth offset value.

11. An apparatus of claim 8, wherein the apparatus is further caused to:
generate at least one new candidate depth offset value for the image with reference to the second camera location;
initiate a first rendering of at least one test image onto the three-dimensional map based on the at least one depth offset value;
initiate a second rendering of the at least one test image onto the three-dimensional map based on the at least one new candidate depth offset value; and
initiate an analysis of the first rendering and the second rendering to determine one or more rendering characteristics associated with the first rendering and the second rendering.

12. An apparatus of claim 8, wherein the apparatus is further caused to:
initiate an updating of the depth offset value buffer with the at least one depth offset value or the at least one new candidate depth offset value based on the analysis.

13. An apparatus of claim 1, wherein the apparatus is further caused to:
determine that the image includes a plurality of overlapping images; and
initiate a sorting, a blending, or a combination thereof of the plurality of overlapping images based on the confidence value.

14. An apparatus of claim 1, wherein the image includes at least one video, the apparatus is further caused to:
determine at least one three-dimensional motion track for the at least one video,
wherein the confidence value, the rendering of the first pixels onto the three-dimensional map is based on the at least one three-dimensional motion track.

15. A method comprising:
determining, by an apparatus, each of a plurality of first pixels of an image that geometrically corresponds to a second pixel of a rendered three-dimensional map, wherein the three-dimensional map is a three-dimensional geographic map;
processing, by the apparatus, the each first pixel and the second pixel to determine a confidence value that increases as a transparency level for the rendering of the each first pixel onto the three-dimensional map decreases, wherein the confidence value indicates an estimated level of geometric distortion of the each first pixel as projected onto the three-dimensional map resulting from a difference between an image capturing perspective of the image with respect to the each first pixel and a virtual viewing perspective of the three-dimensional map;
initiating, by the apparatus, a rendering of the first pixels onto the three-dimensional map from the virtual viewing perspective based on the confidence value;
determining, by the apparatus, at least one user interaction with the three-dimensional map; and
initiating, by the apparatus, a dynamic updating of the confidence value, the rendering of the first pixels onto the three-dimensional map, or a combination thereof based on the at least one user interaction,
wherein the confidence value of a respective first pixel decreases as the virtual viewing perspective moves further away from the image capturing perspective.

16. A method of claim 15, wherein the at least one user interaction results in a change in (a) the virtual viewing perspective for the three-dimensional map, (b) at least one rendering characteristic for at least one of the first pixels, the image, the second pixel, and the three-dimensional map; or (c) a combination thereof, and wherein the at least one rendering characteristic includes a fade parameter, a toggle parameter, a size parameter, or a combination thereof.

17. A method of claim 15, further comprising:
initiating a comparison of the confidence value against at least one threshold confidence criterion to determine whether to cause the rendering of the first pixels onto the three-dimensional map.

18. A method of claim 15, further comprising:
processing metadata associated with the each first pixel and the second pixel;
determining a first camera location associated with the image and a second camera location associated with the three-dimensional map based on the metadata; and
determining an offset between the first camera location and the second camera location,
wherein the confidence value is further based on the offset.

* * * * *